United States Patent
Gupta et al.

(10) Patent No.: US 10,747,746 B2
(45) Date of Patent: Aug. 18, 2020

(54) EFFICIENT READ REPLICAS

(71) Applicant: Amazon Technologies, Inc., Reno, NV (US)

(72) Inventors: Anurag Windlass Gupta, Atherton, CA (US); Pradeep Jnana Madhavarapu, Mountain View, CA (US); Samuel James McKelvie, Seattle, WA (US); Yan Valerie Leshinsky, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 917 days.

(21) Appl. No.: 13/873,467

(22) Filed: Apr. 30, 2013

(65) Prior Publication Data

US 2014/0324785 A1    Oct. 30, 2014

(51) Int. Cl.
G06F 16/00    (2019.01)
G06F 16/23    (2019.01)
G06F 16/27    (2019.01)

(52) U.S. Cl.
CPC ...... G06F 16/2365 (2019.01); G06F 16/2358 (2019.01); G06F 16/273 (2019.01)

(58) Field of Classification Search
CPC ........... G06F 12/0808; G06F 17/30091; G06F 17/30079; G06F 17/30085; G06F 17/30174; G06F 17/30345; G06F 17/30371; G06F 17/30578; G06F 17/30902; G06F 16/2358; G06F 16/2365; G06F 16/273
USPC .................................................. 707/609–686
See application file for complete search history.

(56) References Cited

U.S. PATENT DOCUMENTS

| | | |
|---|---|---|
| 5,280,612 A | 1/1994 | Lorie et al. |
| 5,452,445 A | 9/1995 | Hallmark et al. |
| 5,471,614 A | 11/1995 | Kakimoto |
| 5,524,205 A | 6/1996 | Lomet et al. |
| 5,530,850 A | 6/1996 | Ford et al. |
| 5,870,758 A | 2/1999 | Bamford et al. |

(Continued)

FOREIGN PATENT DOCUMENTS

| | | |
|---|---|---|
| CA | 2783370 | 7/2011 |
| CN | 102043686 | 5/2011 |

(Continued)

OTHER PUBLICATIONS

International Search Report and Written Opinion from PCT/US14/36257, dated Sep. 25, 2014, pp. 1-17.

(Continued)

*Primary Examiner* — Michelle N Owyang
(74) *Attorney, Agent, or Firm* — Kowert, Hood, Munyon, Rankin & Goetzel, P.C.; Robert C. Kowert

(57) ABSTRACT

A database system may receive a write request that specifies a modification to be made to a particular data record stored by the database system. A log record representing the modification to be made to the particular data record may be sent to a storage service of the database system. An indication (e.g., log record or other indication) that indicates a cached version of the particular data record stored in a read replica's cache is stale may be sent to a read replica. For a subsequent read of the particular data record received by the read replica, the read replica may request the particular data record from the storage service.

21 Claims, 8 Drawing Sheets

(56) References Cited

U.S. PATENT DOCUMENTS

| | | | |
|---|---|---|---|
| 5,907,848 A | 5/1999 | Zaiken et al. | |
| 5,951,695 A | 9/1999 | Kolovson | |
| 6,041,423 A | 3/2000 | Tsukerman | |
| 6,233,585 B1 | 5/2001 | Gupta et al. | |
| 6,240,413 B1 | 5/2001 | Learmont | |
| 6,615,219 B1 | 9/2003 | Bruso et al. | |
| 6,615,223 B1* | 9/2003 | Shih | G06F 16/27 707/625 |
| 6,631,374 B1 | 10/2003 | Klein et al. | |
| 6,732,124 B1 | 5/2004 | Koseki et al. | |
| 6,732,171 B2 | 5/2004 | Hayden | |
| 6,792,518 B2 | 9/2004 | Armangau et al. | |
| 6,832,229 B2 | 12/2004 | Reed | |
| 6,976,022 B2 | 12/2005 | Vemuri et al. | |
| 7,010,645 B2 | 3/2006 | Hetzler et al. | |
| 7,089,253 B2 | 8/2006 | Hinshaw et al. | |
| 7,146,386 B2 | 12/2006 | Xiao | |
| 7,287,034 B2 | 10/2007 | Wong et al. | |
| 7,305,386 B2 | 12/2007 | Hinshaw et al. | |
| 7,308,456 B2 | 12/2007 | Friske et al. | |
| 7,328,226 B1 | 2/2008 | Karr et al. | |
| 7,651,593 B2* | 1/2010 | Prahlad | G06F 16/2365 202/204 |
| 7,653,668 B1* | 1/2010 | Shelat | G06F 11/2094 707/610 |
| 7,716,645 B2 | 5/2010 | Dolby et al. | |
| 7,747,663 B2 | 6/2010 | Atkin et al. | |
| 7,885,922 B2 | 2/2011 | Pareek et al. | |
| 7,930,271 B2 | 4/2011 | Tarbell | |
| 7,937,551 B2 | 5/2011 | Schott | |
| 7,979,670 B2 | 7/2011 | Saliba et al. | |
| 8,086,650 B1 | 12/2011 | Milford | |
| 8,176,012 B1 | 5/2012 | Rabii et al. | |
| 8,209,515 B2 | 6/2012 | Schott | |
| 8,255,627 B2 | 8/2012 | Blinick et al. | |
| 8,266,114 B2 | 9/2012 | Mace et al. | |
| 8,271,830 B2 | 9/2012 | Erofeev | |
| 8,289,801 B2 | 10/2012 | Smith et al. | |
| 8,301,670 B2 | 10/2012 | Revah et al. | |
| 8,326,897 B2 | 12/2012 | Butterworth et al. | |
| 8,341,128 B1 | 12/2012 | Ruggiero | |
| 8,370,715 B2 | 2/2013 | Hafner et al. | |
| 8,380,670 B2 | 2/2013 | Kuber et al. | |
| 8,392,479 B1 | 3/2013 | Pantin | |
| 8,396,831 B2 | 3/2013 | Larson et al. | |
| 8,412,689 B2 | 4/2013 | Reid et al. | |
| 8,412,752 B2 | 4/2013 | Dodge | |
| 8,429,121 B2 | 4/2013 | Pareek et al. | |
| 8,463,825 B1 | 6/2013 | Harty et al. | |
| 8,874,508 B1* | 10/2014 | Mittal | G06F 11/2097 707/610 |
| 10,067,952 B2* | 9/2018 | Ahrens | G06F 11/1456 |
| 2002/0107835 A1 | 8/2002 | Coram et al. | |
| 2002/0143733 A1 | 10/2002 | Mukkamalla et al. | |
| 2004/0133622 A1 | 7/2004 | Clubb et al. | |
| 2004/0225696 A1 | 11/2004 | Wong et al. | |
| 2004/0249869 A1 | 12/2004 | Oksanen | |
| 2005/0015416 A1 | 1/2005 | Yamagami | |
| 2005/0256972 A1 | 11/2005 | Cochran et al. | |
| 2006/0020634 A1 | 1/2006 | Huras et al. | |
| 2006/0047626 A1 | 3/2006 | Raheem | |
| 2006/0224636 A1 | 10/2006 | Kathuria et al. | |
| 2007/0083570 A1 | 4/2007 | Fineberg | |
| 2007/0174541 A1 | 7/2007 | Chandrasekaran et al. | |
| 2008/0010322 A1 | 1/2008 | Lee et al. | |
| 2008/0183973 A1 | 7/2008 | Aguilera et al. | |
| 2008/0235291 A1 | 9/2008 | Lahiri et al. | |
| 2008/0294648 A1 | 11/2008 | Lin et al. | |
| 2009/0228511 A1 | 9/2009 | Atkin et al. | |
| 2009/0249001 A1 | 10/2009 | Narayanan et al. | |
| 2010/0036861 A1 | 2/2010 | Srihari et al. | |
| 2010/0050172 A1 | 2/2010 | Ferris | |
| 2010/0192131 A1 | 7/2010 | Dolby et al. | |
| 2011/0035548 A1 | 2/2011 | Kimmel et al. | |
| 2011/0060724 A1 | 3/2011 | Chan | |
| 2011/0072217 A1 | 3/2011 | Hoang et al. | |
| 2011/0145193 A1 | 6/2011 | Pareek et al. | |
| 2011/0161496 A1 | 6/2011 | Nicklin | |
| 2011/0178984 A1* | 7/2011 | Talius | G06F 11/2094 707/634 |
| 2011/0251997 A1 | 10/2011 | Wang et al. | |
| 2012/0005196 A1 | 1/2012 | Horii | |
| 2012/0011106 A1 | 1/2012 | Reid et al. | |
| 2012/0041899 A1 | 2/2012 | Greene et al. | |
| 2012/0166390 A1 | 6/2012 | Merriman et al. | |
| 2012/0174112 A1 | 7/2012 | Vaidya et al. | |
| 2012/0191648 A1 | 7/2012 | Kuber et al. | |
| 2012/0233123 A1* | 9/2012 | Shisheng | G06F 11/004 707/639 |
| 2012/0259889 A1 | 10/2012 | Dinker et al. | |
| 2012/0297073 A1 | 11/2012 | Glover et al. | |
| 2012/0303581 A1 | 11/2012 | Calder et al. | |
| 2012/0310985 A1 | 12/2012 | Gale et al. | |
| 2012/0310986 A1 | 12/2012 | Frantz et al. | |
| 2012/0310991 A1 | 12/2012 | Frantz et al. | |
| 2012/0323849 A1 | 12/2012 | Garin, Jr. et al. | |
| 2013/0036281 A1 | 2/2013 | Revah et al. | |
| 2013/0042056 A1 | 2/2013 | Shats et al. | |
| 2013/0042156 A1 | 2/2013 | Srinivasan et al. | |
| 2013/0080386 A1 | 3/2013 | Dwyer et al. | |
| 2013/0080388 A1 | 3/2013 | Dwyer et al. | |
| 2013/0086129 A1 | 4/2013 | Brown et al. | |
| 2014/0172794 A1* | 6/2014 | Bartholoma | G06F 16/27 707/634 |
| 2014/0250153 A1* | 9/2014 | Nixon | G05B 15/02 707/812 |

FOREIGN PATENT DOCUMENTS

| | | |
|---|---|---|
| EP | 0675451 | 10/1995 |
| EP | 1630674 | 3/2006 |
| JP | H10-254748 | 9/1998 |
| JP | 2000057032 | 2/2000 |
| JP | 2000259474 | 9/2000 |
| JP | 2005050024 | 2/2005 |
| JP | 2005276094 | 10/2005 |
| JP | 2006263581 | 10/2006 |
| JP | 2007200182 | 8/2007 |
| JP | 2007206759 | 8/2007 |
| JP | 2007317017 | 12/2007 |
| JP | 2008003932 | 1/2008 |
| JP | 2012014502 | 1/2012 |
| JP | 2012507072 | 3/2012 |
| JP | 2013008291 | 1/2013 |

OTHER PUBLICATIONS

"Amazon Web Services Blog" Downloaded Apr. 30, 2013 from http://aws.typepad.com/aws/2010/10/amazon-rds-announcing-read-replicas.html, Published Oct. 5, 2010 pp. 1-11.

"Isolation (database systems)" downloaded from http://en.wikipedia.org/wiki/Isolation_(database_systems) on May 15, 2013, pp. 1-7.

"Bloom Filter" Downloaded from http://en.wikipedia.org/wiki/Bloom_filter on May 15, 2013, pp. 1-12.

John Clarke "SQL Result Set Cache in Oracle 11 gR2" published Nov. 16, 2011 downloaded May 15, 2013 from http://www.centroid.com/knowledgebase/blog/sql-result-set-cache-in-oracle-11 gr2, pp. 1-27.

Jim Czuprynski "Oracle Database 11g: SQL Query Result Set Caching" published Jul. 30, 2008, downloaded May 15, 2013 from http://www.databasejournal.com/features/oracle/article.php/3760761/Oracle-Database-11 g-SQL -Query-Result-Set-Caching.htm, pp. 1-7.

"Oracle Database JDBC Developer's Guide and Reference: Chapter 20 Statement and Result Set Caching" downloaded from http://docs.oracle.com/cd/B28359_01/java.1111b31224/stmtcach.htm via the Wayback Machine Nov. 27, 2011, pp. 1-8.

Adrian Billington "Query Result Cache in Oracle 11g" downloaded from http://web.archive.org/web/20080124161135/http://www.oracle-developer.net/display.php?id=503 via the Wayback Machine Jan. 4, 2008, pp. 1-20.

(56) References Cited

OTHER PUBLICATIONS

Julian Dontcheff "Bloom Filters for DBAs" published Aug. 28, 2012, downloaded from http://juliandontcheff.wordpress.com/2012/08/28/bloom-filters-for-dbas/ on May 14, 2013, pp. 1-4.
Julian Dyke "Result Cache Internals" Nov. 2007, pp. 1-38.
Michele Cyran et al "Oracle Database Concepts 10g Release 2 (10.2)" Oct. 2005, pp. 1-542.
U.S. Appl. No. 13/892,027, filed May 10, 2013, Anurag Windlass Gupta.
U.S. Appl. No. 13/902,381, filed May 24, 2013, Anurag Windlass Gupta.
U.S. Appl. No. 13/893,004, filed May 13, 2013, Laurion Darrell Burchall.
U.S. Appl. No. 13/901,111, filed May 23, 2013, Anurag Windlass Gupta.
U.S. Appl. No. 13/894,969, filed May 25, 2013, Grant Alexander MacDonald McAlister.
U.S. Appl. No. 13/903,674, filed May 28, 2013, Anurag Windlass Gupta.
Latika C. Savade, et al., "A Technique to Search Log Records using System of Linear Equations", Software Engineering (CONSEG), 2012 CSI Sixth International Conference, IEEE, Sep. 5, 2012, pp. 1-4.
Jim Gray, et al., "Transaction Processing: Concepts and Techniques—Chapter 10", In: "The Morgan Kaufmann Series in data management systems", Jan. 1, 1993, pp. 529-582.
Jim Gray, et al., "Transaction Processing: Concepts and Techniques—Chapter 12", In: "The Morgan Kaufmann series in data management systems", Jan. 1, 1993, pp. 631-657.
Mokrane Bouzeghoub, et al., "A Framework for Analysis of Data Freshness", Information Quality in Information Systems, ACM, Jun. 18, 2004, pp. 59-67.
M. Tamer Ozsu, et al., "Princeiples of Distributed Database Systems—Chapter 13—Data Replication", In: Principles of Distributed Database Systems, Third Edition, Mar. 2, 2011, Springer, pp. 459-495.
Extended European Search Report from PCT/US2014/036257, dated Nov. 28, 2016, Amazon Technologies, Inc., pp. 1-10.
Hector Garcia-Molina, et al., "Database Systems—The Complete Book Second Edition—Chapter 18—Concurrency Control", In: "Database systems the complete book, Second Edition", Jun. 15, 2005, pp. 883-951.
Atul Adya, et al., "Efficient Optimistic Concurrency Control Using Loosely Synchronized Clocks", SIGMOD Record, ACM, vol. 24, No. 2, May 22, 1995, pp. 23-34.
Neeta Garimella, "Understanding and exploiting snapshot technology for data protection, Part 1: Snapshot technology overview", IBM developerWorks, Apr. 26, 2006, Retrieved from URL: https://web.archive.org/web/20070125115155/http://www-128.ibm.com/developerworks/tivoli/library/t-snaptsm1/index.html, pp. 1-7.
Office Action from Japanese Patent Application No. 2016-512028, dated Feb. 14, 2017 (English translation and Japanese version), pp. 1-19.
Office Action from Chinese Application No. 201480035256.4 , dated Apr. 30, 2013, (English Translation and Chinese Version), Amazon Technologies, pages.
Jim Gray et al, "Transaction Processing: Concepts and Techniques—Chapter 10", dated Jan. 1, 1993, pp. 529-561.
Sailesh Chutani et al "The Episode File System", In Proceedings of the USENIX Winter 1992 Technical Conference, Jan. 20, 1992, pp. 43-60.
"Oracle TimesTen In-Memory Database Architectural Overview Release 6.0", Dated Jan. 1, 2006, Retrieved from the Internet: URL:http://downlaod.oracle.com/otn_hosted_doc/timesten/603/TimesTen-Documentation/arch.pdf, pp. 1-122.
Office Action from European Application No. 14791149.9-1222, dated Nov. 10, 2019, (Amazon Technologies, Inc.), pp. 1-8.

* cited by examiner

EFFICIENT READ REPLICAS

BACKGROUND

Distribution of various components of a software stack can, in some cases, provide (or support) fault tolerance (e.g., through replication), higher durability, and less expensive solutions (e.g., through the use of many smaller, less-expensive components rather than fewer large, expensive components). However, databases have historically been among the components of the software stack that are least amenable to distribution. For example, it can difficult to distribute databases while still ensuring the so-called ACID properties (e.g., Atomicity, Consistency, Isolation, and Durability) that they are expected to provide.

While most existing relational databases are not distributed, some existing databases are "scaled out" (as opposed to being "scaled up" by merely employing a larger monolithic system) using one of two common models: a "shared nothing" model, and a "shared disk" model. In general, in a "shared nothing" model, received queries are decomposed into database shards (each of which includes a component of the query), these shards are sent to different compute nodes for query processing, and the results are collected and aggregated before they are returned. In general, in a "shared disk" model, every compute node in a cluster has access to the same underlying data. In systems that employ this model, great care must be taken to manage cache coherency. In both of these models, a large, monolithic database is replicated on multiple nodes (including all of the functionality of a stand-alone database instance), and "glue" logic is added to stitch them together. For example, in the "shared nothing" model, the glue logic may provide the functionality of a dispatcher that subdivides queries, sends them to multiple compute notes, and then combines the results. In a "shared disk" model, the glue logic may serve to fuse together the caches of multiple nodes (e.g., to manage coherency at the caching layer). These "shared nothing" and "shared disk" database systems can be costly to deploy, complex to maintain, and may over-serve many database use cases.

A third model is a read replica model that is used to scale out read processing. According to a typical read replica model, as changes are made to the structure of the database, a SQL record may be created in a logical replication log which may then be propagated to all the replicas. Each replica would then run these SQL statements locally on their own versions of the database. Since the logs are shipped asynchronously, the read replica operates at some lag from the primary database, and there is some loss of data if the read replica needs to be promoted to be a primary.

Figure 1:
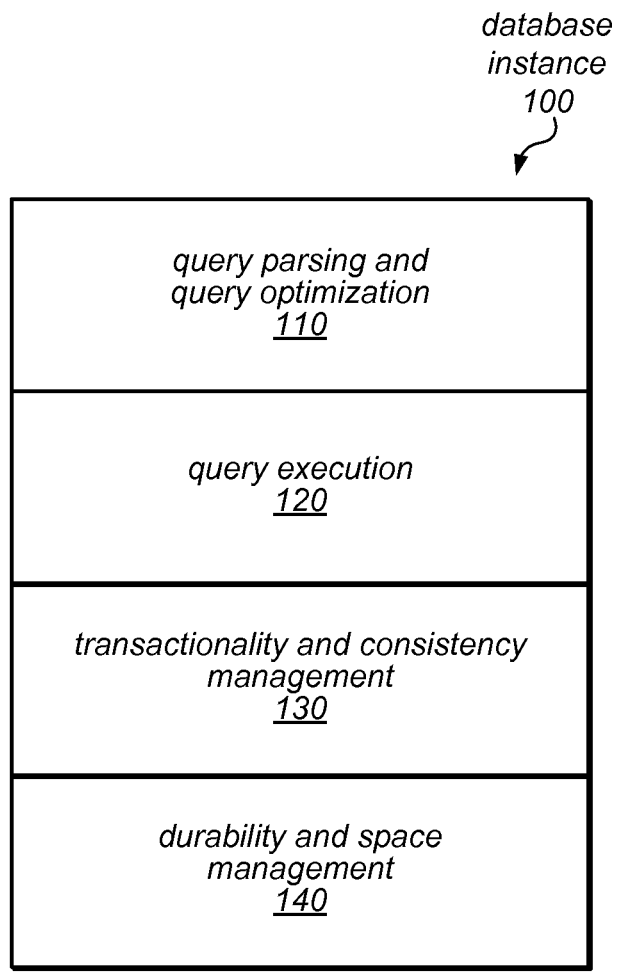
FIG. 1 is a block diagram illustrating various components of a database software stack, according to one embodiment.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of read replicas are disclosed. Various ones of the present embodiments may include a primary node of a database service receiving, from a client of the database service, a write request that specifies a modification to be made to a record stored by the database service. Various ones of the present embodiments may also include sending a redo log record representing the modification to be made to a server node of a distributed storage service that stores a version of the record. Various ones of the present embodiments may further include sending an indication (e.g., a notification, the actual redo log record, etc.) to one or more read replicas that any cached versions of the data record stored in the respective caches of the one or more read replicas is stale. For subsequent reads of that data record received by the read replicas, the read replicas may retrieve the current version of the data record from the distributed storage service instead of from the cache. In some embodiments, the read replica may be configured to convert (e.g., fail over) into a primary node (e.g., after failure of a primary node) without loss of data.

The specification first describes an example web services-based database service that includes the disclosed read replicas. Included in the description of the example web services-based database service are various aspects of the example web services-based database service, such as a database engine, read replicas, and a separate distributed database storage service. The specification then describes flowcharts of various embodiments of methods for maintaining and using the read replicas, including converting a read replica into a primary node. Next, the specification describes an example system that may implement the disclosed techniques. Various examples are provided throughout the specification.

The systems described herein may, in some embodiments, implement a web service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented database architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single primary node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, and/or various space management operations) may be offloaded from the database engine to the storage layer and distributed across multiple nodes and storage devices. For example, in some embodiments, rather than the database engine applying changes to database tables (or data pages thereof) and then sending the modified data pages to the storage layer, the application of changes to the stored database tables (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). In some embodiments, crash recovery (e.g., the rebuilding of data pages from stored redo log records) may also be performed by the storage layer and may also be performed by a distributed (and, in some cases, lazy) background process.

In some embodiments, because redo logs and not modified data pages are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time. Moreover, communications (e.g., a cache invalidation request) sent from a primary node of the database tier to read replicas of the database tier may be asynchronous as well.

As previously noted, in typical large database systems, the entire data set needs to be restored before the database system can be restarted following a failure in the system. In these database systems, following a crash, the system must determine the last point at which it was known that all of the data pages had been flushed to disk (e.g., a checkpoint) and must replay any change logs from that point forward. For example, before the database can be made available to handle incoming queries from client processes, a system process must read in all of the data pages that were changed after the determined checkpoint and apply each of the applicable change log records that had not already been applied to those data pages.

In some embodiments, the database systems described herein may be able to restart the database engine following a failure (e.g., to make the database available to accept and service queries) almost immediately after a database crash, without having to wait for the entire data set to be restored. Instead, queries can be received and serviced while crash recovery is performed lazily by one or more background threads. For example, following a crash, multiple background threads may operate in parallel on different storage nodes to reconstruct data pages from corresponding redo logs. In the meantime, if an incoming query targets a data page that has not yet been reconstructed, the storage layer may be configured to re-create that data page on the fly from the appropriate redo logs.

In general, after being given a piece of data, a primary requirement of a database is that it can eventually give that piece of data back. To do this, the database may include several different components (or tiers), each of which performs a different function. For example, a traditional database may be thought of as having three tiers: a first tier for performing query parsing, optimization and execution; a second tier for providing transactionality, recovery, and durability; and a third tier that provides storage, either on locally attached disks or on network-attached storage. As noted above, previous attempts to scale a traditional database have typically involved replicating all three tiers of the database and distributing those replicated database instances across multiple machines.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may be configured to receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

Note that the storage service illustrated and described in FIGS. 1-5 is simply an example. Other storage services that are coupled to the database engine and read replicas may also be used in various embodiments.

FIG. 1 is a block diagram illustrating various components of a database software stack, according to one embodiment. As illustrated in this example, a database instance may include multiple functional components (or layers), each of which provides a portion of the functionality of the database instance. In this example, database instance 100 includes a query parsing and query optimization layer (shown as 110), a query execution layer (shown as 120), a transactionality and consistency management layer (shown as 130), and a durability and space management layer (shown as 140). As noted above, in some existing database systems, scaling a database instance may involve duplicating the entire database instance one or more times (including all of the layers illustrated in FIG. 1), and then adding glue logic to stitch them together. In some embodiments, the systems described herein may instead offload the functionality of durability and space management layer 140 from the database tier to a separate storage layer, and may distribute that functionality across multiple storage nodes in the storage layer.

In some embodiments, the database systems described herein may retain much of the structure of the upper half of the database instance illustrated in FIG. 1, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using only metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), cancelling or aborting a query, and/or other operations.

In some embodiments, the database tier of a database instance may include a primary node server, which may also be referred to herein as a database engine head node server, that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed database-optimized storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system. In some embodiments, a client-side driver for the distributed storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum. Similarly, for a read request directed to a particular segment, the client-side driver may route the read request to all of the nodes on which the segment is stored (e.g., asynchronously and in parallel, at substantially the same time). As soon as the client-side driver receives the requested data from a read quorum of the storage nodes in the protection group, it may return the requested data to the database tier (e.g., to the database engine head node).

In some embodiments, the database tier (or more specifically, the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments.

In some embodiments, the database tier may support the use of synchronous or asynchronous read replicas in the system, e.g., read-only copies of data on different nodes of the database tier to which read requests can be routed. In such embodiments, if the database engine head node for a given database table receives a read request directed to a particular data page, it may route the request to any one (or a particular one) of these read-only copies. Or, in some embodiments, a client read request may be received directly by a read replica (from a client), without first going through the database engine head node. In some embodiments, the client-side driver in the database engine head node may be configured to notify these other read replica nodes (e.g., to a client-side driver of those other nodes) about updates and/or invalidations to cached data pages. In response, the read replicas may be configured to invalidate their caches (e.g., a specific page or record of the cache or the whole cache). For subsequent reads directed to the invalidated cache data, the read replicas may be configured to retrieve updated copies of updated data pages (or log records of changes to those pages to apply them to the cache) from the storage layer. In some embodiments, the read replicas may be configured to receive an indication (e.g., a manifest) of data pages stored in the cache of the database engine head node, which may include pages that are hot on the read and write side. The read replicas may be configured to retrieve the hot pages from the storage layer, which may help prepare a read replica node to convert to a head node (e.g., if the head node fails). In addition, the read replicas may be configured to update an in-memory structure (e.g., a transaction table) to determine which redo and undo records were inflight (e.g., not received or known by the read replica) at the time of the head node failure. As a result, the converted read replica may already have a warm cache (e.g., the cache may not have to be rebuilt from scratch) as part of the conversion process.

In some embodiments, the client-side driver(s) running on the database engine head node and/or the read replicas may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database tables, a number of replication copies, zones, or regions and/or whether replication is synchronous or asynchronous based upon their durability, performance and cost objectives.

In some embodiments, the client side driver(s) (of the head node and/or read replicas) may maintain metadata about the volume and may directly send asynchronous requests to each of the storage nodes necessary to fulfill read requests and write requests without requiring additional hops between storage nodes. For example, in some embodiments, in response to a request to make a change to a database table, the client-side driver may be configured to determine the one or more nodes that are implementing the storage for the targeted data page, and to route the redo log record(s) specifying that change to those storage nodes. The storage nodes may then be responsible for applying the change specified in the redo log record to the targeted data page at some point in the future. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, many read requests may be served by the database engine head node cache and/or the by the cache of a particular read replica. However, write requests may require durability, since large-scale failure events may be too common to allow only in-memory replication. Therefore, the systems described herein may be configured to minimize the cost of the redo log record write operations that are in the foreground latency path by implementing data storage in the storage tier as two regions: a small append-only log-structured region into which redo log records are written when they are received from the database tier, and a larger region in which log records are coalesced together to create new versions of data pages in the background. In some embodiments, an in-memory structure may be maintained for each data page that points to the last redo log record for that page, backward chaining log records until an instantiated data block is referenced. This approach may provide good performance for mixed read-write workloads, including in applications in which reads are largely cached.

In some embodiments, because accesses to the log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by coalescing data pages at the storage nodes of the distributed storage system based on receipt of the redo log records.

As previously noted, in some embodiments, the storage tier of the database system may be responsible for taking database snapshots. However, because the storage tier implements log-structured storage, taking a snapshot of a data page (e.g., a data block) may include recording a timestamp associated with the redo log record that was most recently applied to the data page/block (or a timestamp associated with the most recent operation to coalesce multiple redo log records to create a new version of the data page/block), and preventing garbage collection of the previous version of the page/block and any subsequent log entries up to the recorded point in time. For example, taking a database snapshot may not require reading, copying, or writing the data block, as would be required when employing an off-volume backup strategy. In some embodiments, the space requirements for snapshots may be minimal, since only modified data would require additional space, although user/subscribers may be able to choose how much additional space they want to keep for on-volume snapshots in addition to the active data set. In different embodiments, snapshots may be discrete (e.g., each snapshot may provide access to all of the data in a data page as of a specific point in time) or continuous (e.g., each snapshot may provide access to all versions of the data that existing in a data page between two points in time). In some embodiments, reverting to a prior snapshot may include recording a log record to indicate that all redo log records and data pages since that snapshot are invalid and garbage collectable, and discarding all database cache entries after the snapshot point. In such embodiments, no roll-forward may be required since the storage system will, on a block-by-block basis, apply redo log records to data blocks as requested and in the background across all nodes, just as it does in normal forward read/write processing. Crash recovery may thereby be made parallel and distributed across nodes.

Figure 2:
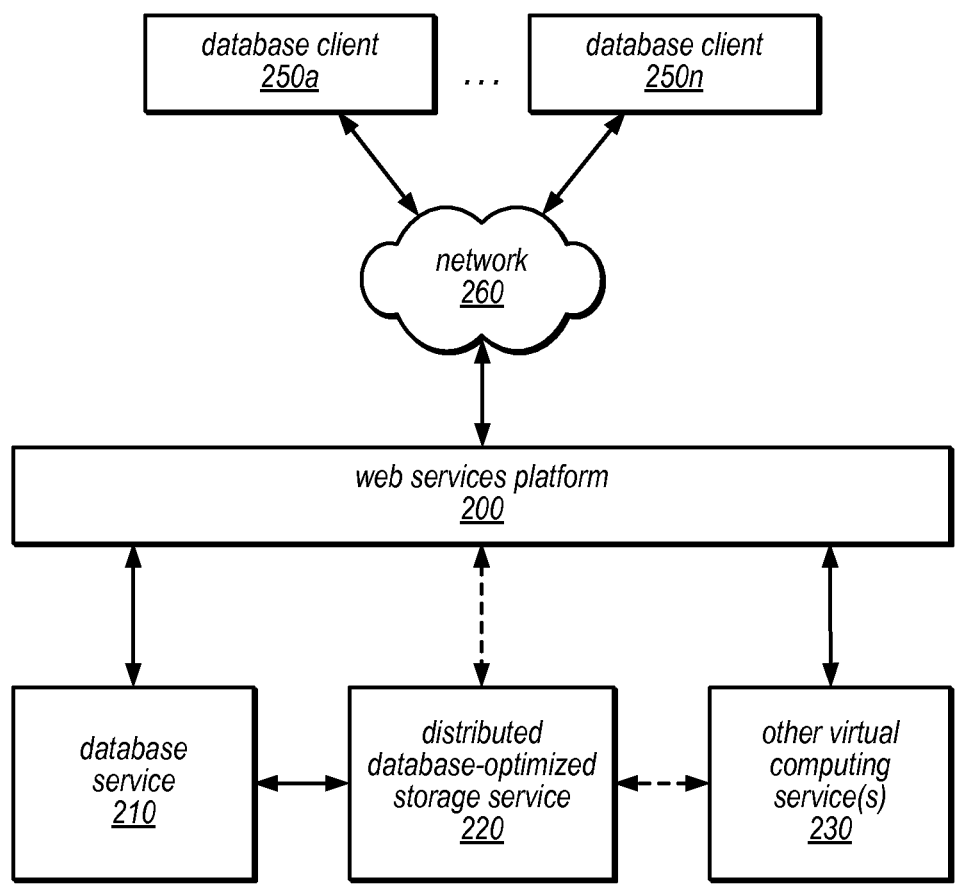
FIG. 2 is a block diagram illustrating a service system architecture that may be configured to implement a web services-based database service configured to use the disclosed read replicas, according to some embodiments.

One embodiment of a service system architecture that may be configured to implement a web services-based database service is illustrated in FIG. 2. In the illustrated embodiment, a number of clients (shown as database clients 250a-250n) may be configured to interact with a web services platform 200 via a network 260. Web services platform 200 may be configured to interface with one or more instances of a database service 210 (an instance may include a head node and a number of read replicas), a distributed database-optimized storage service 220 and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit web services requests to web services platform 200 via network 260, including requests for database services. For example, a given client 250 may include a suitable version of a web browser, or may include a plug-in module or other type of code module configured to execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing web services requests without necessarily implementing full browser support for all types of web-based data. That is, client 250 may be an application configured to interact directly with web services platform 200. In some embodiments, client 250 may be configured to generate web services requests according to a Representational State Transfer (REST)-style web services architecture, a document- or message-based web services architecture, or another suitable web services architecture.

In some embodiments, a client 250 (e.g., a database service client) may be configured to provide access to web services-based storage of database tables to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model of FIG. 1. Instead, the details of interfacing to Web services platform 200 may be coordinated by client 250 and the operating system or file system on behalf of applications executing within the operating system environment.

Clients 250 may convey web services requests to and receive responses from web services platform 200 via network 260. In various embodiments, network 260 may encompass any suitable combination of networking hardware and protocols necessary to establish web-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and web services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and web services platform 200. It is noted that in some embodiments, clients 250 may communicate with web services platform 200 using a private network rather than the public Internet. For example, clients 250 may be provisioned within the same enterprise as a database service system (e.g., a system that implements database service 210 and/or distributed database-optimized storage service 220). In such a case, clients 250 may communicate with platform 200 entirely through a private network 260 (e.g., a LAN or WAN that may use Internet-based communication protocols but which is not publicly accessible).

Generally speaking, web services platform 200 may be configured to implement one or more service endpoints configured to receive and process web services requests, such as requests to access data pages (or records thereof). For example, web services platform 200 may include hardware and/or software configured to implement a particular endpoint, such that an HTTP-based web services request directed to that endpoint is properly received and processed. In one embodiment, web services platform 200 may be implemented as a server system configured to receive web services requests from clients 250 and to forward them to components of a system that implements database service 210, distributed database-optimized storage service 220 and/or another virtual computing service 230 for processing. In other embodiments, web services platform 200 may be configured as a number of distinct systems (e.g., in a cluster topology) implementing load balancing and other request management features configured to dynamically manage large-scale web services request processing loads. In various embodiments, web services platform 200 may be configured to support REST-style or document-based (e.g., SOAP-based) types of web services requests.

In addition to functioning as an addressable endpoint for clients' web services requests, in some embodiments, web services platform 200 may implement various client management features. For example, platform 200 may coordinate the metering and accounting of client usage of web services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed database-optimized storage service 220 and/or another virtual computing service 230 (or the underlying systems that implement those services).

In some embodiments, platform 200 may also implement user authentication and access control procedures. For example, for a given web services request to access a particular database table, platform 200 may be configured to ascertain whether the client 250 associated with the request is authorized to access the particular database table. Platform 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, platform 200 may reject the corresponding web services request, for example by returning a response to the requesting client 250 indicating an error condition. Various access control policies may be stored as records or lists of access control information by database service 210, distributed database-optimized storage service 220 and/or other virtual computing services 230.

It is noted that while web services platform 200 may represent the primary interface through which clients 250 may access the features of a database system that implements database service 210, it need not represent the sole interface to such features. For example, an alternate API that may be distinct from a web services interface may be used to allow clients internal to the enterprise providing the database system to bypass web services platform 200. Note that in many of the examples described herein, distributed database-optimized storage service 220 may be internal to a computing system or an enterprise system that provides database services to clients 250, and may not be exposed to external clients (e.g., users or client applications). In such embodiments, the internal "client" (e.g., database service 210) may access distributed database-optimized storage service 220 over a local or private network, shown as the solid line between distributed database-optimized storage service 220 and database service 210 (e.g., through an API directly between the systems that implement these services). In such embodiments, the use of distributed database-optimized storage service 220 in storing database tables on behalf of clients 250 may be transparent to those clients. In other embodiments, distributed database-optimized storage service 220 may be exposed to clients 250 through web services platform 200 to provide storage of database tables or other information for applications other than those that rely on database service 210 for database management. This is illustrated in FIG. 2 by the dashed line between web services platform 200 and distributed database-optimized storage service 220. In such embodiments, clients of the distributed database-optimized storage service 220 may access distributed database-optimized storage service 220 via network 260 (e.g., over the Internet). In some embodiments, a virtual computing service 230 may be configured to receive storage services from distributed database-optimized storage service 220 (e.g., through an API directly between the virtual computing service 230 and distributed database-optimized storage service 220) to store objects used in performing computing services 230 on behalf of a client 250. This is illustrated in FIG. 2 by the dashed line between virtual computing service 230 and distributed database-optimized storage service 220. In some cases, the accounting and/or credentialing services of platform 200 may be unnecessary for internal clients such as administrative clients or between service components within the same enterprise.

Note that in various embodiments, different storage policies may be implemented by database service 210 and/or distributed database-optimized storage service 220. Examples of such storage policies may include a durability policy (e.g., a policy indicating the number of instances of a database table (or data page thereof) that will be stored and the number of different nodes on which they will be stored) and/or a load balancing policy (which may distribute database tables, or data pages thereof, across different nodes, volumes and/or disks in an attempt to equalize request traffic). In addition, different storage policies may be applied to different types of stored items by various one of the services. For example, in some embodiments, distributed database-optimized storage service 220 may implement a higher durability for redo log records than for data pages.

Figure 3:
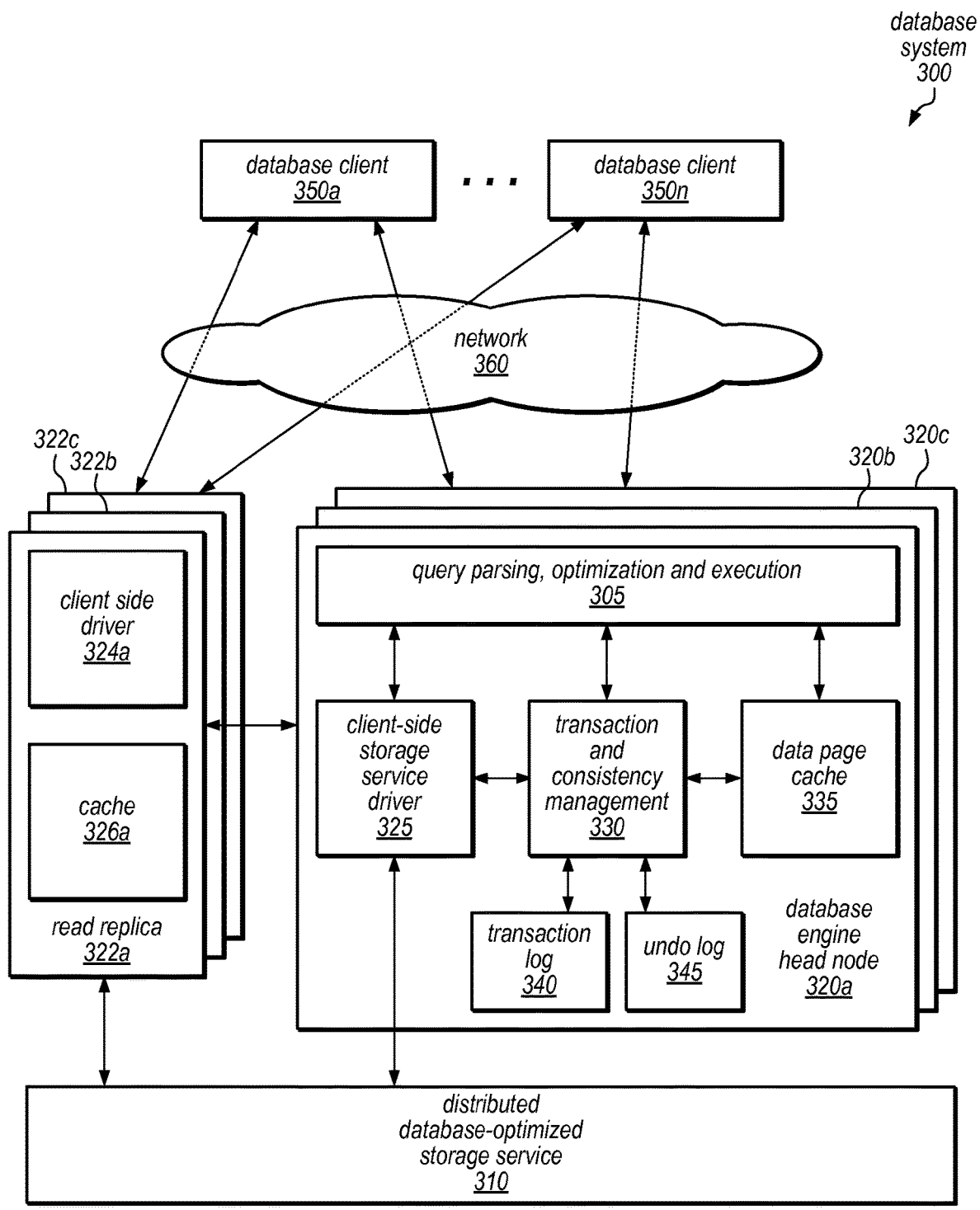
FIG. 3 is a block diagram illustrating various components of a database system configured to use the disclosed read replicas, according to one embodiment.

FIG. 3 is a block diagram illustrating various components of a database system that includes a database engine, read replicas, and a separate distributed database storage service, according to one embodiment. In this example, database system 300 includes a respective database engine head node 320 and a plurality of read replicas 322a, 322b, and 322c for each of several database tables and a distributed database-optimized storage service 310 (which may or may not be visible to the clients of the database system, shown as database clients 350a-350n). As illustrated in this example, one or more of database clients 350a-350n may access a database head node 320 (e.g., head node 320a, head node 320b, or head node 320c, each of which is a component of a respective database instance) and/or a read replica (e.g., read replica 322a, 322b, or 322c) via network 360 (e.g., these components may be network-addressable and accessible to the database clients 350a-350n). Note that any number of read replicas may be associated with a particular database instance but for ease of illustration and explanation, three read replicas are shown in FIG. 3. Distributed database-optimized storage service 310, which may be employed by the database system to store data pages of one or more database tables (and redo log records and/or other metadata associated therewith) on behalf of database clients 350a-350n, and to perform other functions of the database system as described herein, may or may not be network-addressable and accessible to the storage clients 350a-350n, in different embodiments. For example, in some embodiments, distributed database-optimized storage service 310 may perform various storage, access, change logging, recovery, and/or space management operations in a manner that is invisible to storage clients 350a-350n.

As previously noted, each database instance may include a single database engine head node 320 that receives requests from various client programs (e.g., applications) and/or subscribers (users), then parses them, optimizes them, and develops an execution plan to carry out the associated database operation(s). Also as previously noted, each read replica may receive read requests (e.g., from various client programs, subscribers, and/or from the database engine head node), and may similarly parse such requests, optimize them, and develop an execution plan to carry out the read (e.g., SELECT). In the example illustrated in FIG. 3, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350a, which may include write acknowledgements, requested data pages (or portions thereof), error messages, and or other responses, as appropriate. As illustrated in this example, database engine head node 320a may also include a client-side storage service driver 325, which may route read requests and/or redo log records to a read replica and/or various storage nodes within distributed database-optimized storage service 310, receive write acknowledgements from distributed database-optimized storage service 310, receive requested data pages from distributed database-optimized storage service 310, and/or return data pages, error messages, or other responses to query parsing, optimization, and execution component 305 (which may, in turn, return them to database client 350a).

In this example, database engine head node 320a includes data page cache 335, in which data pages that were recently accessed (read and/or write) may be temporarily held. As illustrated in FIG. 3, database engine head node 320a may also include transaction and consistency management component 330, which may be responsible for providing transactionality and consistency in the database instance of which database engine head node 320a is a component. For example, this component may be responsible for ensuring the Atomicity, Consistency, and Isolation properties of the database instance and the transactions that are directed that the database instance. As illustrated in FIG. 3, database engine head node 320a may also include transaction log 340 and undo log 345, which may be employed by transaction and consistency management component 330 to track the status of various transactions and roll back any locally cached results of transactions that do not commit.

Note that each of the other database engine head nodes 320 illustrated in FIG. 3 (e.g., 320b and 320c) may include similar components and may perform similar functions for queries received by one or more of database clients 350a-350n and directed to the respective database instances of which it is a component.

In various embodiments, each of the read replicas 322a, 322b, and 322c may also include components similar to those of the database engine head node and/or may be configured to include such components (e.g., upon conversion of a read replica to a database engine head node to replace the old head node). As shown, each read replica may include cache 326a and client side driver 324a. Client side driver 324a may be similar to client-side storage service driver 325 of the database engine head node. Moreover, communication between the head node and the read replicas may be communication between client side driver 324a and client-side storage service driver 325. Cache 326a may be similar to data page cache 335 in that it may be configured to store recently accessed data pages. Note that data pages stored in the cache of one read replica may be different than data pages stored in the cache of another read replica which may also be different than data pages stored in data page cache 335. Moreover, the actual data stored for a data page in the cache of one read replica may be different from the actual data stored for the same data page in the cache another read replica and/or from the actual data for the same data page stored in data page cache 335.

In some embodiments, upon sending a redo log (or undo log) to the storage layer, client-side storage service driver 325 may also be configured to send a cache invalidation indication (which may be asynchronous) to the read replicas. The cache invalidation indication may indicate that the cache record corresponding to the redo log is stale (if the read replica stores a cache record corresponding to the redo log) and/or it may actually be the redo log record. For a subsequently received read request (from a client) to read the data corresponding to the stale cached data, the read replica may request an updated version of the data (e.g., in the form of one or more redo/undo log records, a coalesced log record, or the actual data page) from distributed database-optimized storage service 310, apply the log record that was received from the primary node to create the current version of the data, and return the current version to the client requesting the read. In some embodiments, the read replica may then update its cache with the current version of the data record and remove/reset the invalidation indication for that data. In some embodiments, the invalidation indication may be the actual redo log (or undo log) and the read replica may be configured to apply the log record and/or one or more log records from the distributed storage service to the stale cached version of the data record thereby updating it so it is no longer stale.

In various embodiments, one of read replicas 322a, 322b, or 322c may be converted into a new database engine head node (e.g., if the head node fails). To help prepare for such a conversion, one or more of the read replicas may be configured to receive, from the database engine head node (while still active), an indication of the data pages stored in the head node's cache. The indication may be a manifest of data pages that are hot on the read and write side. The read replicas may then retrieve versions of those data pages, for example, from distributed database-optimized storage service 310, and may store those retrieved data pages in cache. The manifest/indication may be sent periodically (e.g., hourly, daily, etc.) or upon certain events (e.g., every read/write, every 10 read/writes, upon some internal head node logic indicating potential head node failover, etc.). As such, the read replicas' caches may be a warmer cache in the event of a conversion to head node. In one embodiment, web service platform 200 may determine that a head node has failed and select which read replica to convert. In other embodiments, the first read replica to detect the head node's failure may determine that it should convert into a head node or the read replicas may vote for which read replica to convert. In yet another embodiment, a given one of the read replicas may be preselected as the first option to convert into a head node if the previous head node fails. Other ways to determine which read replica to convert also exist. In some embodiments, no loss of data may occur in the conversion process because the read replica is connect to the same data storage as written to by the primary node, and therefore has access to all of its data. This is in contrast to a system in which the read replicas utilize a different data storage that is separate than that written to by the primary node. In such a system using different data storage, data loss may occur if the replication was performed asynchronously or poor performance may occur if the replication was performed synchronously.

Moreover, there may exist log records (e.g., redo and/or undo) corresponding to transactions that were inflight to the read replicas from the previous head node that were unknown (e.g., not seen, not received) to the read replicas but were received by distributed database-optimized storage service 310. Therefore, even if the manifest helps keep the read replicas' respective caches somewhat up to date, they may nevertheless still be stale in some respect. Therefore, in one embodiment, the read replica that is converted into the new head node may (before or after conversion) be configured to determine which was the last log record (e.g., as identified by a monotonically increasing identifier, such as a log sequence number (LSN)) that the read replica was aware of. The read replica may then be configured to request which data records having corresponding log records later than the last log record have changed and invalidate those in cache. The read replica may also be configured to request the actual log records and/or the data records to update its own cache so it is no longer invalid/stale. Further, the read replicas may be configured to maintain a transaction table of the inflight transactions. The read replicas may be configured to request distributed database-optimized storage service 310 to send the inflight transactions to the read replicas and then update in memory structures (e.g., the transaction table) according to the inflight transactions. The converted read replica may be configured to determine that a particular transaction of the inflight transactions was related to the failure of the head node (e.g., caused it to crash) and roll back a change of that transaction (e.g., not apply it to its own cache and/or instruct the storage layer to remove its application at the storage layer).

In some embodiments, the distributed database-optimized storage systems described herein may organize data in various logical volumes, segments, and pages for storage on one or more storage nodes. For example, in some embodiments, each database is represented by a logical volume, and each logical volume is segmented over a collection of storage nodes. Each segment, which lives on a particular one of the storage nodes, contains a set of contiguous block addresses. In some embodiments, each data page is stored in a segment, such that each segment stores a collection of one or more data pages and a change log (also referred to as a redo log) for each data page that it stores. As described in detail herein, the storage nodes may be configured to receive redo log records (which may also be referred to herein as ULRs) and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the database table is being maintained in the database system). For example, in different embodiments, one, two, or three copies of the data or change logs may be stored in each of one, two, or three different availability zones or regions, according to a default configuration, an application-specific durability preference, or a client-specified durability preference.

As used herein, the following terms may be used to describe the organization of data by a distributed database-optimized storage system, according to various embodiments.

Volume: A volume is a logical concept representing a highly durable unit of storage that a user/client/application of the storage system understands. More specifically, a volume is a distributed store that appears to the user/client/application as a single consistent ordered log of write operations to various user pages of a database table. Each write operation may be encoded in a User Log Record (ULR), which represents a logical, ordered mutation to the contents of a single user page within the volume. As noted above, a ULR may also be referred to herein as a redo log record. Each ULR may include a unique LSN, or Log Sequence Number, which may be an identifier that uses monotonically increasing values to denote an ordering. For example LSN 1 is earlier than LSN 3, which is earlier than LSN6. Note that each number in sequence need not be used. For example, LSNs 1, 2, 3, 4, and 6 may exist but not LSN 5 in some embodiments. Each ULR may be persisted to one or more synchronous segments in the distributed store that form a Protection Group (PG), to provide high durability and availability for the ULR. A volume may provide an LSN-type read/write interface for a variable-size contiguous range of bytes.

In some embodiments, a volume may consist of multiple extents, each made durable through a protection group. In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

Segment: A segment is a limited-durability unit of storage assigned to a single storage node. More specifically, a segment provides limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node. Within a storage node, multiple segments may live on each SSD, and each segment may be restricted to one SSD (e.g., a segment may not span across multiple SSDs). In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment).

Storage page: A storage page is a block of memory, generally of fixed size. In some embodiments, each page is a block of memory (e.g., of virtual memory, disk, or other physical memory) of a size defined by the operating system, and may also be referred to herein by the term "data block". More specifically, a storage page may be a set of contiguous sectors. It may serve as the unit of allocation in SSDs, as well as the unit in log pages for which there is a header and metadata. In some embodiments, and in the context of the database systems described herein, the term "page" or "storage page" may refer to a similar block of a size defined by the database configuration, which may typically a multiple of 2, such as 4096, 8192, 16384, or 32768 bytes.

Log page: A log page is a type of storage page that is used to store log records (e.g., redo log records or undo log records). In some embodiments, log pages may be identical in size to storage pages. Each log page may include a header containing metadata about that log page, e.g., metadata identifying the segment to which it belongs. Note that a log page is a unit of organization and may not necessarily be the unit of data included in write operations. For example, in some embodiments, during normal forward processing, write operations may write to the tail of the log one sector at a time.

Log Records: Log records (e.g., the individual elements of a log page) may be of several different classes. For example, User Log Records (ULRs), which are created and understood by users/clients/applications of the storage system, may be used to indicate changes to user data in a volume. Control Log Records (CLRs), which are generated by the storage system, may contain control information used to keep track of metadata such as the current unconditional volume durable LSN (VDL). Null Log Records (NLRB) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page. In some embodiments, log record types may be identified by GUIDs (rather than by integers or enums), which may simplify versioning and development, especially for ULRs.

Payload: The payload of a log record is the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size. In addition, most log records may include additional parameters or data specific to that log record type, and this additional information may be considered the payload of that log record. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages.

Note that when storing log records in the segment log, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage; otherwise the storage may be referred to as being out-of-band. In some embodiments, the payloads of most large AULRs may be stored out-of-band in the cold zone of log (which is described below).

User pages: User pages are the byte ranges (of a fixed size) and alignments thereof for a particular volume that are visible to users/clients of the storage system. User pages are a logical concept, and the bytes in particular user pages may or not be stored in any storage page as-is. The size of the user pages for a particular volume may be independent of the storage page size for that volume. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware.

Data page: A data page is a type of storage page that is used to store user page data in compressed form. In some embodiments every piece of data stored in a data page is associated with a log record, and each log record may include a pointer to a sector within a data page (also referred to as a data sector). In some embodiments, data pages may not include any embedded metadata other than that provided by each sector. There may be no relationship between the sectors in a data page. Instead, the organization into pages may exist only as an expression of the granularity of the allocation of data to a segment.

Storage node: A storage node is a single virtual machine that on which storage node server code is deployed. Each storage node may contain multiple locally attached SSDs, and may provide a network API for access to one or more segments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance.

SSD: As referred to herein, the term "SSD" may refer to a local block storage volume as seen by the storage node, regardless of the type of storage employed by that storage volume, e.g., disk, a solid-state drive, a battery-backed RAM, an NVMRAM device (e.g., one or more NVDIMMs), or another type of persistent storage device. An SSD is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each SSD may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

Figure 4:
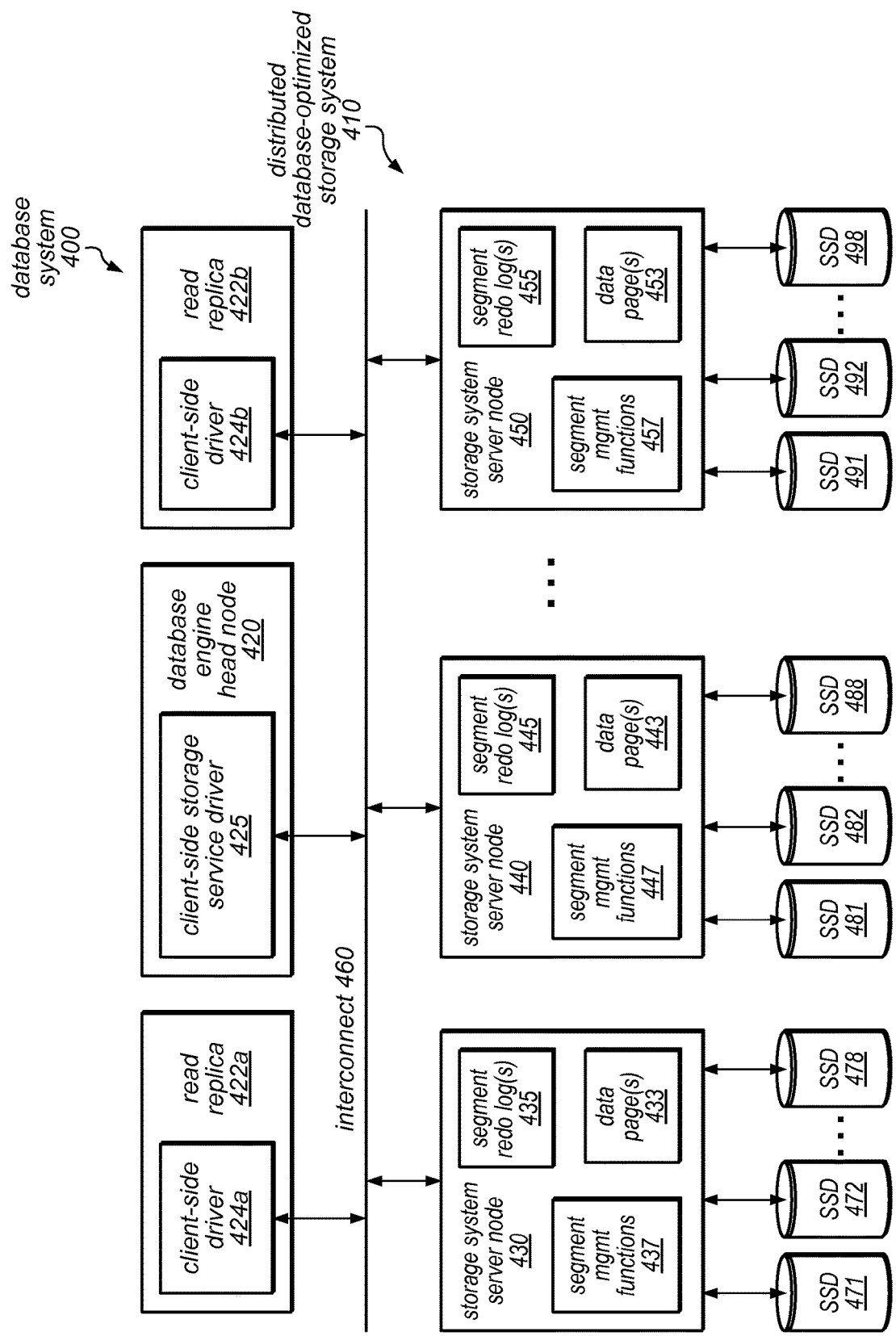
FIG. 4 is a block diagram illustrating a distributed database-optimized storage system configured to use the disclosed read replicas, according to one embodiment.

One embodiment of a distributed database-optimized storage system is illustrated by the block diagram in FIG. 4. In this example, a database system 400 includes a distributed database-optimized storage system 410, which communicates with a database engine head node 420, read replica 422*a*, and read replica 422*b* (only two read replicas are shown for ease of illustration/explanation) over interconnect 460. As in the example illustrated in FIG. 3, database engine head node 420 may include a client-side storage service driver 425 and read replicas 422*a* and 422*b* may each include a client-side driver 424*a* and 424*b*, respectively. In this example, distributed database-optimized storage system 410 includes multiple storage system server nodes (including those shown as 430, 440, and 450), each of which includes storage for data pages and redo logs for the segment(s) it stores, and hardware and/or software configured to perform various segment management functions. For example, each storage system server node may include hardware and/or software configured to perform at least a portion of any or all of the following operations: replication (locally, e.g., within the storage node), coalescing of redo logs to generate data pages, crash recovery, and/or space management (e.g., for a segment). Each storage system server node may also have multiple attached storage devices (e.g., SSDs) on which data blocks may be stored on behalf of clients (e.g., users, client applications, and/or database service subscribers).

In the example illustrated in FIG. 4, storage system server node 430 includes data page(s) 433, segment redo log(s) 435, segment management functions 437, and attached SSDs 471-478. Again note that the label "SSD" may or may not refer to a solid-state drive, but may more generally refer to a local block storage volume, regardless of its underlying hardware. Similarly, storage system server node 440 includes data page(s) 443, segment redo log(s) 445, segment management functions 447, and attached SSDs 481-488; and storage system server node 450 includes data page(s) 453, segment redo log(s) 455, segment management functions 457, and attached SSDs 491-498.

As previously noted, in some embodiments, a sector is the unit of alignment on an SSD and may be the maximum size on an SSD that can be written without the risk that the write will only be partially completed. For example, the sector size for various solid-state drives and spinning media may be 4 KB. In some embodiments of the distributed database-optimized storage systems described herein, each and every sector may include have a 64-bit (8 byte) CRC at the beginning of the sector, regardless of the higher-level entity of which the sector is a part. In such embodiments, this CRC (which may be validated every time a sector is read from SSD) may be used in detecting corruptions. In some embodiments, each and every sector may also include a "sector type" byte whose value identifies the sector as a log sector, a data sector, or an uninitialized sector. For example, in some embodiments, a sector type byte value of 0 may indicate that the sector is uninitialized.

Figure 5:
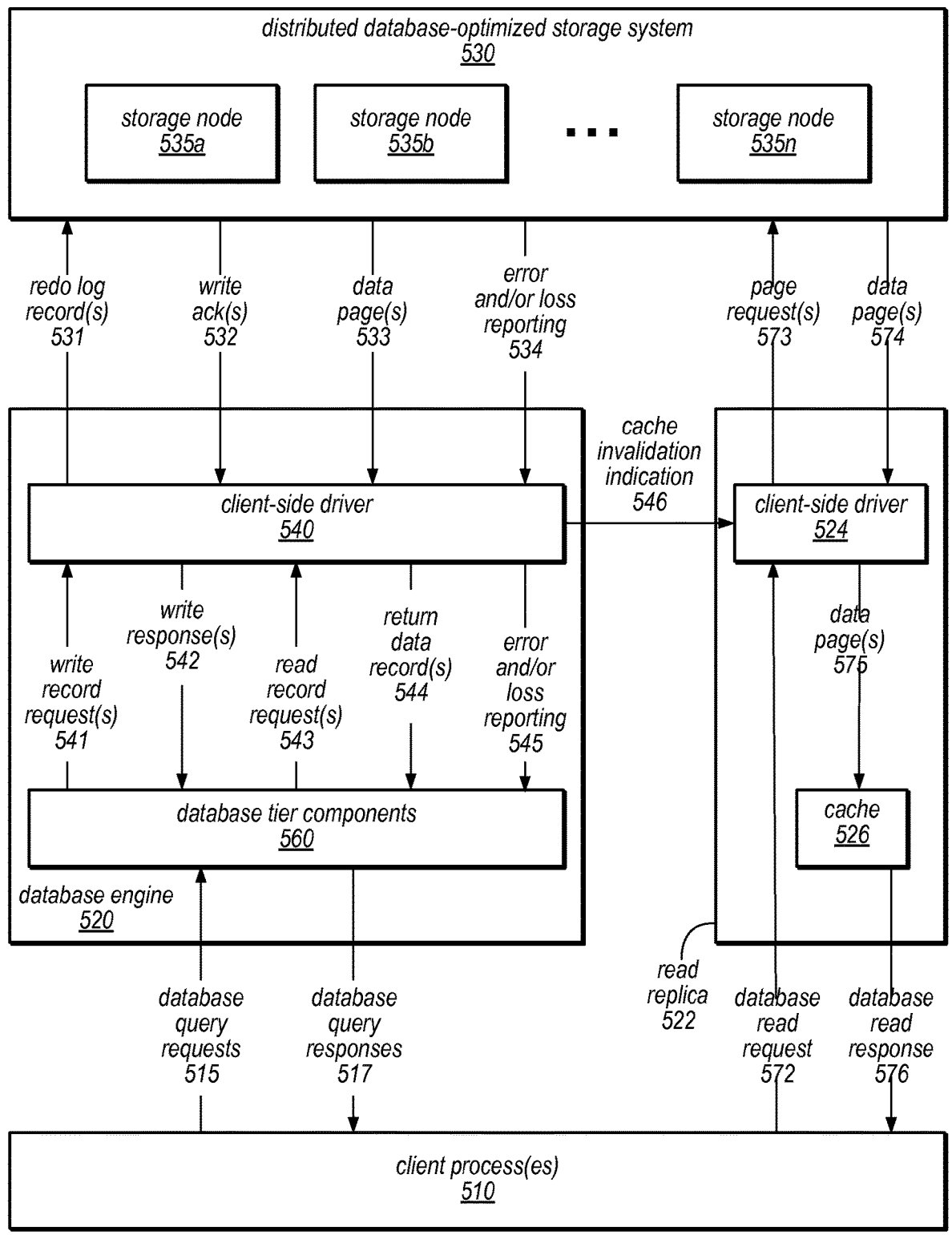
FIG. 5 is a block diagram illustrating the use of a separate distributed database-optimized storage system in a database system configured to use the disclosed read replicas, according to one embodiment.

FIG. 5 is a block diagram illustrating the use of a separate distributed database-optimized storage system in a database system, according to one embodiment. In this example, one or more client processes 510 may store data to one or more database tables maintained by a database system that includes a database engine 520 and a distributed database-optimized storage system 530. In the example illustrated in FIG. 5, database engine 520 includes database tier components 560 and client-side driver 540 (which serves as the interface between distributed database-optimized storage system 530, database tier components 560, and read replica 522). In some embodiments, database tier components 560 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3).

In this example, one or more client processes 510 may send database query requests 515 (which may include read and/or write requests targeting data stored on one or more of the storage nodes 535*a*-535*n*) to database tier components 560, and may receive database query responses 517 from database tier components 560 (e.g., responses that include write acknowledgements and/or requested data). Each database query request 515 that includes a request to write to a data page may be parsed and optimized to generate one or more write record requests 541, which may be sent to client-side driver 540 for subsequent routing to distributed database-optimized storage system 530. In this example, client-side driver 540 may generate one or more redo log records 531 corresponding to each write record request 541, and may send them to specific ones of the storage nodes 535 of distributed database-optimized storage system 530. In some embodiments, for write requests, client-side driver 540 may send cache invalidation indication 546 (e.g., a notification and/or the one or more redo log records 531) to client-side driver 524 of read replica 522. Distributed database-optimized storage system 530 may return a corresponding write acknowledgement 523 for each redo log record 531 to database engine 520 (specifically to client-side driver 540). Client-side driver 540 may pass these write acknowledgements to database tier components 560 (as write responses 542), which may then send corresponding responses (e.g., write acknowledgements) to one or more client processes 510 as one of database query responses 517.

In this example, each database query request 515 that includes a request to read a data page may be parsed and optimized to generate one or more read record requests 543, which may be sent to clients-side driver 540 for subsequent routing to distributed database-optimized storage system 530. In this example, client-side driver 540 may send these requests to specific ones of the storage nodes 535 of distributed database-optimized storage system 530, and distributed database-optimized storage system 530 may return the requested data pages 533 to database engine 520 (specifically to client-side driver 540). Client-side driver 540 may send the returned data pages to the database tier components 560 as return data records 544, and database tier components 560 may then send the data pages to one or more client processes 510 as database query responses 517. Note that certain read and write requests may be made to a cache (e.g., data page cache 335) of database engine, in addition to, or instead of being made to distributed database-optimized storage system 530. As part of parsed and optimizing certain read requests, some, or all, of the read query plan may be passed to read replica 522 for performing the read.

In some embodiments, various error and/or data loss messages 534 may be sent from distributed database-optimized storage system 530 to database engine 520 (specifically to client-side driver 540). These messages may be passed from client-side driver 540 to database tier components 560 as error and/or loss reporting messages 545, and then to one or more client processes 510 along with (or instead of) a database query response 517.

As described herein, in various embodiments, for write requests, client-side driver 540 may send cache invalidation indication 546 (e.g., a notification and/or the one or more redo log records 531) to client-side driver 524 of read replica 522. Cache invalidation indication 546 may indicate that one or more cached data records in cache 526 are stale. In one embodiment, cache invalidation indication 546 may be sent to read replica 522 regardless of whether cache 526 of read replica 522 stores the data that was changed according to the write request. In another embodiment, database engine 520 may determine which read replica(s), if any, store data that corresponds to the data changed by the write request and selectively send cache invalidation indication 546 to those read replica(s).

In some embodiments, client process(es) 510 may submit database read request 572 directly to read replica 522 to query the database. For a request for non-stale cached data, read replica may retrieve the requested data from cache 526 and return it to client process(es) as database read response 576. For a request for a data record that is present in cache 526 as stale data or for a data record that is not present in cache 526, client-side driver 524 may send page request(s) 573 to distributed database-optimized storage system 530 and the requested data page(s) 574 may be returned to read replica 522 and then provided to client process(es) 510 as database read response 576. In one embodiment, data page(s) 574 may be routed through client-side driver 524 of read replica 522 and the data page(s) may be stored in cache 526 and replace the stale cached data or replace some other data that is determined as cold data (e.g., is accessed less frequently than other cached data).

In various embodiments, read replica 522 may be converted into a primary node/database engine. In doing so, the converted read replica may be configured to include all of the components shown in database engine 520, and others not shown in FIG. 5 (e.g., data page cache 335, transaction and consistency management 330, etc.). To help prepare for such a conversion, database engine 520 (while still the primary node) may send an indication (not shown in FIG. 5 but may be sent from client-side driver 540 to client-side driver 524) of the data pages stored in the database engine's cache (e.g., data page cache 335) to read replica 522. As described herein, the indication may be a manifest of data pages that are hot on the read and write side (e.g., most actively read and written). Read replica 522 may then retrieve versions of those data pages, for example, from distributed database-optimized storage service 530, and may store those retrieved data pages in cache. The manifest/ indication may be sent periodically (e.g., hourly, daily, etc.) or upon certain events (e.g., every read/write, every 10 read/writes, upon some internal primary node logic indicating potential primary node failover, etc.). As such, cache 526 of read replica 522 may be warmer than it was before, which may facilitate a quicker recovery and conversion in the event of a failure to the primary node.

In various embodiments, as described herein, there may exist log records (e.g., redo and/or undo) corresponding to transactions (e.g., writes) that were inflight to read replica 522 from the previous primary node, database engine 520, that were unknown (e.g., not seen, not received) to read replica 522 but were received by distributed database-optimized storage service 530. Therefore, even if the manifest helps keep cache 526 somewhat up to date, cache 526 may nevertheless still include some stale entries. Therefore, in one embodiment, read replica 522 that is converted into the new primary node may (before or after conversion) may determine which was the last log record (e.g., as identified by a monotonically increasing identifier, such as an LSN) that read replica 522 received. Read replica 522 may then invalidate data in cache 526 that corresponds to log records having respective identifiers later than the determined last log record that changed. Read replica may request (e.g., from distributed database-optimized storage service 530) the actual log records and/or the data records to update cache 526 so that it no longer is stale. Additionally or alternatively, read replica 522 may maintain an in-memory data structure (e.g., transaction table) of the inflight transactions. Read replica may request the inflight transactions from distributed database-optimized storage service 530 and then update the in-memory structure with the inflight transactions. In one embodiment, the converted read replica may determine that a particular transaction of the inflight transactions was related to the failure of the primary node (e.g., caused it to crash) and roll back a change of that transaction (e.g., not apply it). Note that in a log-structured storage system such as distributed database-optimized storage service 530, the inflight transactions provided by distributed database-optimized storage service 530 may not include each inflight transaction. For example, if the inflight transactions included a redo log identified by LSN 1 that changed data record X from value '1' to value '2', a redo log identified by LSN 2 that then changed data record X to value '4', followed by an undo log identified LSN 3 that undid the change associated with LSN 2, then distributed database-optimized storage service 530 may simply provide the redo log identified by LSN 1 (and not the logs associated with LSNs 2 and 3) to the read replica.

Note that in various embodiments, the API calls and responses between database engine 520 and distributed database-optimized storage system 530 (e.g., APIs 531-534) and/or the API calls and responses between client-side driver 540 and database tier components 560 (e.g., APIs 541-545) and/or API calls and responses between read replica 522 and distributed database-optimized storage system 530 (e.g., APIs 573-574) and/or API calls and responses between client-side driver 524 and cache 526 (e.g., APIs 575 and 547) in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine 520 and/or distributed database-optimized storage system 530.

As noted above, in some embodiments, the functional components of a database system may be partitioned between those that are performed by the database engine and those that are performed in a separate, distributed, database-optimized storage system. In one specific example, in response to receiving a request from a client process (or a thread thereof) to insert something into a database table (e.g., to update a single data block by adding a record to that data block), one or more components of the primary node may perform query parsing, optimization, and execution, and may send each portion of the query to a transaction and consistency management component. The transaction and consistency management component may ensure that no other client process (or thread thereof) is trying to modify the same row at the same time. For example, the transaction and consistency management component may be responsible for ensuring that this change is performed atomically, consistently, durably, and in an isolated manner in the database. For example, the transaction and consistency management component may work together with the client-side storage service driver of the primary node to generate a redo log record to be sent to one of the nodes in the distributed database-optimized storage service and to send it to the distributed database-optimized storage service (along with other redo logs generated in response to other client requests) in an order and/or with timing that ensures the ACID properties are met for this transaction. Upon receiving the redo log record (which may be considered an "update record" by the storage service), the corresponding storage node may update the data block, and may update a redo log for the data block (e.g., a record of all changes directed to the data block). In some embodiments, the database engine may be responsible for generating an undo log record for this change, and may also be responsible for generating a redo log record for the undo log, both of which may be used locally (in the database tier) for ensuring transactionality. However, unlike in traditional database systems, the systems described herein may shift the responsibility for applying changes to data blocks to the storage system (rather than applying them at the database tier and shipping the modified data blocks to the storage system).

Figure 6:
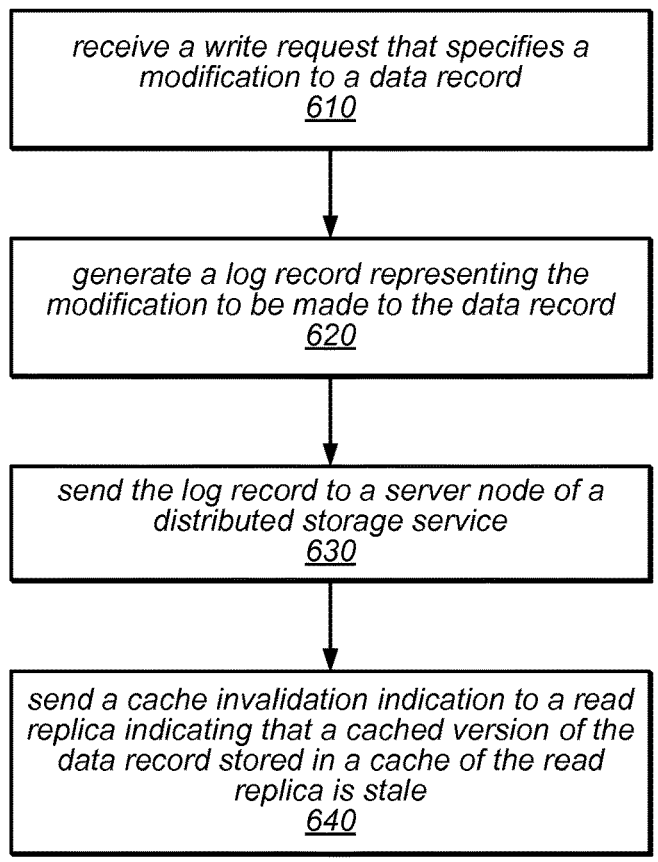
FIG. 6 is a flow diagram illustrating one embodiment of a method for cache invalidation in a read replica of a web services-based database service.

Turning now to FIG. 6, in various embodiments, database system 300 may be configured to invalidate a cache entry in a read replica upon a database write. While the method of FIG. 6 may be described as being performed by various components (e.g., nodes) of a distributed database system, such as the primary node, read replica, or client side drivers of the read replicas and/or primary nodes of FIGS. 3-5, the method need not be performed by any specific component in some cases. For instance, in some cases, the method of FIG. 6 may be performed by some other component or computer system, according to some embodiments. Or, in some cases, components of database system 300 may be combined or exist in a different manner than that shown in the examples of FIG. 3-5. In various embodiments, the method of FIG. 6 may be performed by one or more nodes of a distributed database system, one of which is shown as the computer system of FIG. 10. The method of FIG. 6 is shown as one example implementation of a method for invalidating a cache entry in a read replica upon a database write. In other implementations, the method of FIG. 6 may include additional or fewer blocks than are shown. For example, the method of FIG. 6 may be used in conjunction with one or more blocks of the methods of FIGS. 7, 8, and/or 9.

At 610, a write request that specifies a modification to a data record stored by a database service may be received. For example, the write request (e.g., INSERT, UPDATE, DELETE, etc.) may be received from a client of the database service by a primary node. The write request may specify a modification to be made to a given data record stored in a database table. As a simple example, the write request may specify to change data record A to value '2'.

As shown at 620, a log record representing the modification to be made to the data record may be generated. In one embodiment, the primary node (client side driver) may generate the log record, which may be indicative of the change to the data record (e.g., changes to data record A that would result in changing its value to '2' without including the whole data page itself). In such an embodiment, the log record may not be the entire changed data page that includes the data record itself.

As illustrated at 630, the log record may be sent (e.g., by the client side driver of the primary node) to a particular server node (or multiple server nodes) of a distributed storage service that stores a version of the data page that includes the given data record. The server node may then apply the modification from the log record to the actual data page stored by the server node.

Figure 7:
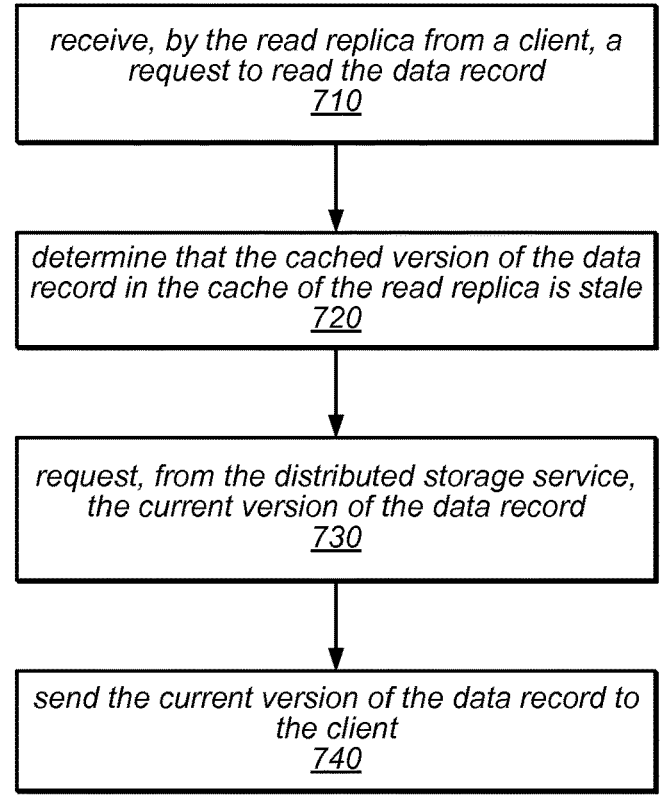
FIG. 7 is a flow diagram illustrating one embodiment of a method for performing a read using the disclosed read replica in a web services-based database service.

As shown at 640, a cache invalidation indication may be sent to a read replica (or to a plurality of read replicas) indicating that a cached version of the given data record stored in the read replica's cache is stale. As described herein, in various embodiments, the cache invalidation indication may be a simple notification identifying the given data record whose corresponding cached data is stale, which may then be stored by the read replica, and/or it may also include the actual log record that was sent to the storage service (e.g., for application by the read replica to its cached version of the data record). The notification may be stored in a data structure maintained by the read replica such that for a subsequent request for data corresponding to the stale data, the read replica will know that the date is stale and retrieve it from the storage service instead of from its cache. In an embodiment in which the cache invalidation indication includes the actual log record, the read replica may apply the modification specified by the log record to its cache. After doing so, that cache entry (and data record) may no longer be indicated as stale. For example, after updating its cache, the client side driver or some other component of the read replica may remove the stale cache indication (e.g., from the data structure maintaining a list of the stale cache entries) for that particular data record. Note that in some embodiments, because the system may be asynchronous and the read replica's cache may be out of date, it may update its cache based on what is stored by the storage service and what is indicated in the log record from the primary node. FIG. 7 describes such a scenario in more detail below.

Turning now to FIG. 7, in various embodiments, a read replica may be configured to receive and respond to a read request. While the method of FIG. 7 may be described as being performed by various components (e.g., nodes) of a distributed database system, such as a read replica, or client side driver of the read replicas of FIGS. 3-5, the method need not be performed by any specific component in some cases. For instance, in some cases, the method of FIG. 7 may be performed by some other component or computer system, according to some embodiments. Or, in some cases, components of database system 300 may be combined or exist in a different manner than that shown in the examples of FIG. 3-5. In various embodiments, the method of FIG. 7 may be performed by one or more nodes of a distributed database system, one of which is shown as the computer system of FIG. 10. The method of FIG. 7 is shown as one example implementation of a method for a read replica receiving and responding to a read request. In other implementations, the method of FIG. 7 may include additional or fewer blocks than are shown. For example, the method of FIG. 7 may be used in conjunction with one or more blocks of the methods of FIGS. 6, 8, and/or 9.

As illustrated at 710, the read replica may receive a request (e.g., from a client) to read the data record (corresponding to the stale entry). Note that the request to read the data record may come sometime after blocks 610-640 have been performed. For example, many reads and/or writes may take place for other data records before the request for the data record corresponding to the stale entry is received at block 710. Or, if that data record is particularly hot, then it may be the next request that is received by the database tier.

Note that the read replica may also receive requests for other data records (e.g., ones that are not stale in the cache, ones that are not stored in the cache at all). For requests for data records that are not stale in cache, the read replica may simply return the requested data from its cache to the client. For requests for data records that are not stored in the read replica's cache, the read replica may request the data from the distributed storage service, receive that data from the storage tier, store the data in cache, and provide the data to the requesting client.

At 720, it may be determined that the cached version of the data record in the cache of the read replica is stale. For example, in one embodiment, such a determination may be based on determining whether a cache invalidation indication is present/active for that particular data record. For example, in one embodiment, the read replica may store such indications (e.g., in a data structure) including which data record(s) they pertain to. In one embodiment, for cache data that is stale, the read replica may not return the stale data to the requesting client. As another example, because the system may be asynchronous, the read replica may store, in its cache, a version of the data record that is up to date as of a temporal identifier (e.g., LSN) with a value of 5. The log record sent by the primary node to the storage service and to the read replica may have an LSN of 10. And the version of the data stored by the storage service may be up to date as of LSN 9. In such an example, the read replica may determine that its version is stale even apart from the log record it receives from the primary node. As described herein, in such an example, the read replica may request log records from the storage service to update its cache before further updating its cache with the log record from the primary node.

As shown at 730, the read replica may request the current version of the data record from the distributed storage service. In one embodiment, the distributed storage service may, in response to the request from the read replica, return the current version of the requested data record (or one or more log records to update the cached version) to the read replica. Continuing the example from above, the read replica may store a version of the data that is up to date as of LSN of 5, the storage service may store a version up to date as of LSN 9, and the log record sent by the primary node may be associated with LSN 10. In such an example, the read replica may request and retrieve, from the storage service, the data record as of LSN 9 or one or more log records associated with LSNs between 5 and 9 and apply those log records itself. At that point, the read replica's cache entry for that data record may be up to date as of LSN 9. Then, the read replica may further update its cached version that is up to date as of LSN 9 with the log record from the primary node to create the current version of the data record as of LSN 10. The read replica may then replace the stale cached data with the current version of the data record from the distributed storage service and as shown at 740, the read replica may then send the current version of the data record to the requesting client.

Note that, in some embodiments, blocks 720 and 730 may be performed upon receiving the log record from the primary node without requiring a request for the particular data record at block 710. A similar scenario is described below at block 830 of FIG. 8. Moreover, further note that updating of the read replica's cache may be performed at times other than in response to receiving the invalidation indication (e.g., log record) from the primary node. For example, the read replica may determine that the version of a data record stored by the storage service is more up to date (e.g., associated with a later LSN) and request and receive the up to date data record or log records to apply to its own cache.

Figure 8:
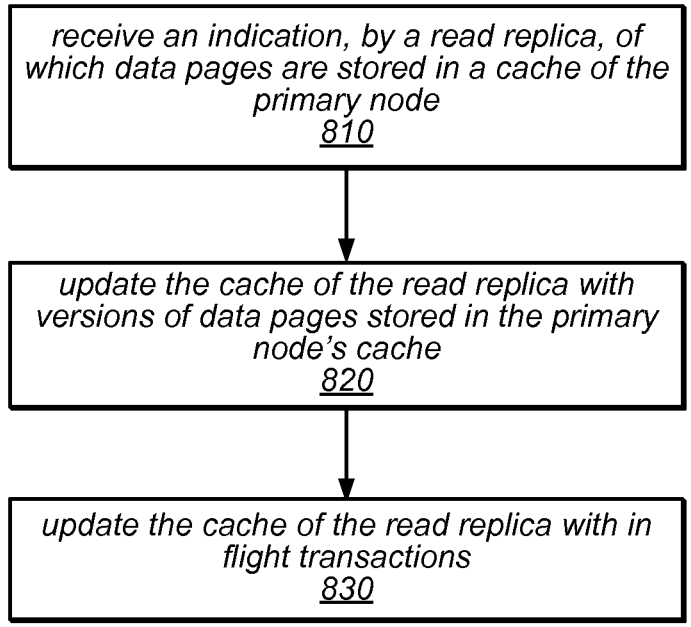
FIG. 8 is a flow diagram illustrating one embodiment of a method for updating the cache of a read replica in a web services-based database service.

Turning now to FIG. 8, in various embodiments, database system 300 may be configured to update (keep warm) the cache of a read replica. While the method of FIG. 8 may be described as being performed by various components (e.g., nodes) of a distributed database system, such as a read replica or client side driver of the read replica of FIGS. 3-5, the method need not be performed by any specific component in some cases. For instance, in some cases, the method of FIG. 8 may be performed by some other component or computer system, according to some embodiments. Or, in some cases, components of database system 300 may be combined or exist in a different manner than that shown in the examples of FIG. 3-5. In various embodiments, the method of FIG. 8 may be performed by one or more nodes of a distributed database system, one of which is shown as the computer system of FIG. 10. The method of FIG. 8 is shown as one example implementation of a method for updating the cache of a read replica. In other implementations, the method of FIG. 8 may include additional or fewer blocks than are shown. For example, the method of FIG. 8 may be used in conjunction with one or more blocks of the methods of FIGS. 6, 7, and/or 9.

As shown at 810, an indication of which data pages are stored in the primary node's cache may be received by the read replica, for example, from the primary node. In one embodiment, the indication may be a manifest of data pages that are present in the primary node's cache, which may correspond to pages that are hot on the read and write side. The manifest/indication may be sent periodically (e.g., hourly, daily, etc.) or upon certain events (e.g., every read/write, every 10 read/writes, upon some internal primary node logic indicating potential primary node failover, etc.).

At 820, the read replica's cache may be updated with versions of the data pages stored in the primary node's cache. For example, the read replicas may request/retrieve versions of the data pages from the manifest, for example, from the distributed database-optimized storage service. The read replicas may then store those retrieved data pages in their respective caches. As such, the read replicas' caches may be warm and therefore allow for a quicker conversion/start up in the event of a conversion/failover to primary node.

As illustrated at 830, the cache of the read replica may be updated with in flight transactions. In one embodiment, there may exist log records (e.g., redo and/or undo) corresponding to transactions that were inflight to the read replicas from the previous primary node that were unknown (e.g., not seen, not received) to the read replicas but were received by distributed storage service. Therefore, even if the manifest helps keep the read replicas' respective caches somewhat up to date, the caches may nevertheless still store some stale data. Therefore, in one embodiment, the read replica that is converted into the new primary node and/or many of the read replicas may (before or after conversion) determine which was the last log record (e.g., as identified by a monotonically increasing identifier, such as an LSN) that the read replica is aware of. The read replica may then request, from the distributed storage service, which data records are associated with log records later than the last log record the read replica is aware of. From that information, the read replica may determine which data is stale (records associated with log records the read replica was not aware of) and indicate it as such. In one embodiment, the read replica may then request the actual log records and/or the data records to update its own cache so it is no longer invalid/stale.

In one embodiment, the read replicas may maintain a transaction table of the inflight transactions. Inflight transaction is used herein to describe a transaction to data that the distributed storage service received from a primary node but that was not known/received by any of the read replicas. The read replicas may request that the distributed storage service send the inflight transactions to the read replicas and then update in-memory structures (e.g., the transaction table) with the inflight transactions. The converted read replica may determine that a particular transaction of the inflight transactions was related to the failure of the primary node (e.g., caused it to crash) and roll back a change of that transaction (e.g., not apply it).

Figure 9:
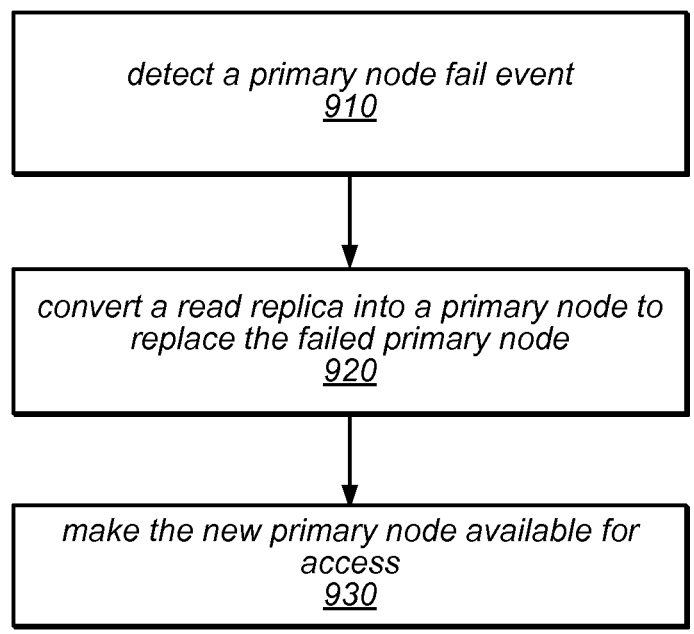
FIG. 9 is a flow diagram illustrating one embodiment of a method for converting a read replica into a primary node in a web services-based database service.

Turning now to FIG. 9, in various embodiments, database system 300 may be configured to convert (e.g., failover) a read replica to a new primary node. While the method of FIG. 9 may be described as being performed by various components (e.g., nodes) of a distributed database system, such as a read replica or client side driver of the read replica of FIGS. 3-5, the method need not be performed by any specific component in some cases. For instance, in some cases, the method of FIG. 9 may be performed by some other component or computer system, according to some embodiments. Or, in some cases, components of database system 300 may be combined or exist in a different manner than that shown in the examples of FIG. 3-5. In various embodiments, the method of FIG. 9 may be performed by one or more nodes of a distributed database system, one of which is shown as the computer system of FIG. 10. The method of FIG. 9 is shown as one example implementation of a method for converting/failing over a read replica to a primary node. In other implementations, the method of FIG. 9 may include additional or fewer blocks than are shown. For example, the method of FIG. 9 may be used in conjunction with one or more blocks of the methods of FIGS. 6, 7, and/or 8.

At 910, a database primary node fail event may be detected. A primary node failure may be any type of system failure which causes the primary node to be unable to continue functioning, such as loss of power, no available memory, system glitch, etc. Detection may occur in a variety of manners. For example, the client side driver of a particular read replica may be unable to communicate with the failed primary node. As another example, the failed primary node may distribute an indication of distress to one or more of the read replicas indicating impending failure of the primary node. Other examples of detecting the failure also exist.

As illustrated at 920, the read replica may be converted into a primary node to replace the previous primary node. Such conversion may be part of a failover process to replace a failed primary node. Which read replica to convert into a primary node can be determined according to a variety of ways (e.g., preselected, voted, first to detect, selected by a web services platform, etc.), as described herein. In one embodiment, the converted read replica may already have established connections with the storage tier as well as other read replicas. If not, conversion at 920 may also include establishing such connections. If inflight transactions are present such that the converted read replica's cache is not completely up to date, one or more blocks of the method of FIG. 8 may be performed to further update the cache. As described herein, because the read replica is attached to the same data storage as is written to by the primary node, no loss of data may occur in converting a read replica into a primary node, in contrast to systems that use separate storage for the read replicas and for the primary node.

As shown at 930, the new primary node may be made available for access, e.g., by other read replicas, by clients, and/or by the storage service. For example, in one embodiment, the new primary node may communicate with the read replicas and/or storage service (and/or an active client, if there is one) indicating that it is the new primary node and indicating that it is in a ready state.

The disclosed read replicas may enhance efficiency by not requiring physical replication (to durable storage) at the data block level and/or by not requiring two entire databases with updates running to both sets of disks. Instead, the primary node and the read replicas may be attached to the same storage. Moreover, because caches may be kept in sync (or approximately in sync), it may facilitate the ability to not require locking or consistency between the read replicas. Keeping the caches in sync in sync may also facilitate failover/conversion of a read replica to a primary node by having the new primary node already have a warm cache, thereby effectively decreasing the overall fail recovery time.

The methods described herein (e.g., the methods of FIGS. 6-9) may, in various embodiments, be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein).

Figure 10:
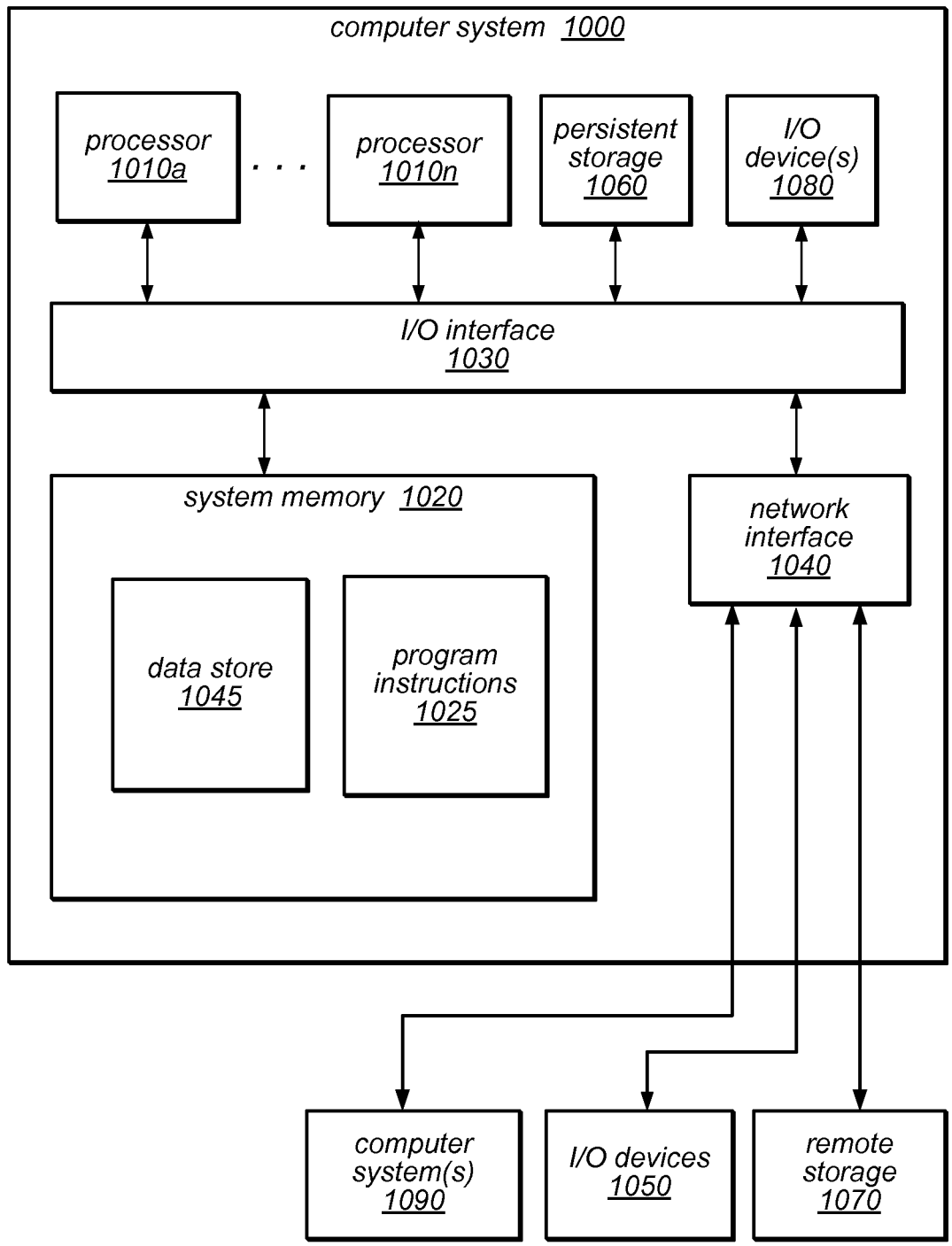
FIG. 10 is a block diagram illustrating a computer system configured to implement efficient read replicas, according to various embodiments.

FIG. 10 is a block diagram illustrating a computer system configured to implement at least a portion of the database systems described herein, according to various embodiments. For example, computer system 1000 may be configured to implement a primary node of a database tier, a read replica, or one of a plurality of storage nodes of a separate distributed database-optimized storage system that stores database tables and associated metadata on behalf of clients of the database tier, in various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a primary node of a database tier, one of a plurality of read replicas, or one of a plurality of storage nodes of a separate distributed database-optimized storage system that stores database tables and associated metadata on behalf of clients of the database tier, in various embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the database tier (e.g., on a primary node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Along those lines, the information described herein as being stored by a read replica, such as various data records stored in a cache of the read replica, in-memory data structures, manifest data structures, and/or other information used in performing the functions of the read replicas described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, data pages, data records, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, primary nodes, read replica nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a primary node and/or read replica nodes within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

The invention claimed is:

1. A method, comprising:
performing, by a database service comprising multiple nodes each having a cache for data records and each capable of serving as a primary node for one or more database tables:
selecting one of the multiple nodes as a primary node to perform write requests on a database table stored in an external distributed storage service accessible to the database service over a network and external to the primary node, wherein a plurality of the multiple nodes other than the primary node implement read replicas for the database table;
receiving, at the primary node included within the database service and from a client of the database service, a write request directed to a given data record in the database table, wherein the write request specifies a modification to be made to the given data record;
responsive to the write request:
generating, at the primary node included within the database service, a redo log record representing the modification to be made to the given data record;
sending, over a network connection from the primary node included within the database service to the external distributed storage service, the redo log record to perform the modification to the given data record on behalf of the client, wherein the external distributed storage service stores a version of a data page comprising the given data record; and
sending, over network connections from the primary node included within the database service to the plurality of read replicas of the database service, the redo log record, wherein the redo log record indicates that cached versions of the given data record stored in respective caches of the plurality of read replicas are stale; and
performing by a read replica of the plurality of read replicas subsequent to receiving the redo log record indicating that the cached version of the given data record is stale:
updating the cache of the read replica to indicate that the respective cached version of the given data record is stale;
receiving a request for the given data record; and
in response to receiving the request for the given data record, obtaining a current version of the given data record over a network connection between the read replica and the external distributed storage service, wherein the current version of the given data record includes the modification performed on the given data record.

2. The method of claim 1, further comprising:
receiving, by the read replica of the plurality of read replicas, from a client of the database service, a request to read the given data record; and
determining that the cached version of the given data record stored in the cache of the read replica of the plurality of read replicas is stale;
requesting, from the external distributed storage service, the current version of the given data record; and
sending the current version of the given data record to the client.

3. The method of claim 1, further comprising:
sending, to the plurality of read replicas, an indication of which data pages are stored in a cache of the primary node; and
updating the respective caches of the plurality of read replicas with versions of the data pages stored in the cache of the primary node.

4. The method of claim 1, further comprising:
converting one of the plurality of read replicas into a new primary node to replace the primary node without a loss of data from an update not reflected in the cache of the one of the plurality of read replicas at a time of conversion.

5. A system, comprising:
a plurality of computing nodes, each of which comprises at least one processor and a memory, wherein the plurality of computing nodes are configured to collectively implement a database service that maintains one or more tables of a database, wherein the plurality of computing nodes each implement a cache for data records and are capable of serving as a primary node for the database, and wherein a primary node of the plurality of computing nodes is configured to perform write requests on the database and another of the plurality of computing nodes other than the primary node is configured to implement a read replica for the database; and
a plurality of storage nodes configured to collectively implement a distributed storage service external to the primary node of the database service and accessible to the database service over a network, the distributed storage service storing a logical volume of complete data for the database maintained by the database service;
wherein the primary node is configured to:
receive a write request that specifies a modification to be made to a particular data record stored by the database service, and responsive to the write request:
send, to the distributed storage service over a network connection, a redo log record representing the modification to be made to the particular data record, wherein the distributed storage service stores a version of a data page comprising the particular data record, and send, to the read replica over another network connection, an indication that a cached version of the particular data record stored in the cache of the read replica is stale, wherein the read replica does not store at least some data records of the database; and wherein the read replica is configured to:

update the cache of the read replica to indicate that the cached version of the particular data record is stale responsive to receipt of the indication from the primary node;

in response to a request for the particular data record indicated to be stale in the cache of the read replica, obtain, from the distributed storage service over a third network connection, a current version of the particular data record, wherein the current version of the particular data record includes the modification performed on the particular data record.

6. The system of claim 5, wherein the indication is a cache invalidation notification.

7. The system of claim 5, wherein the read replica is configured to:

receive, from the primary node, a different redo log record that indicates that a cached version of a data record stored in the cache of the read replica is stale, wherein the distributed storage service stores a version of a data page comprising the data record; and update the cached version of the data record stored in the cache of the read replica using data contained in the different redo log record to be consistent with the version of the data page comprising the data record stored at the distributed storage service.

8. The system of claim 7, wherein the indication is the redo log record, wherein the redo log record is associated with a temporal identifier, and wherein the read replica is configured to:

receive, from a server node of the distributed storage service, one or more log records having respective temporal identifiers representing a later point in time than an earlier temporal identifier associated with the cached version of the particular data record; and apply the one or more log records and the redo log record to the cached version of the particular data record.

9. The system of claim 5, wherein the read replica is configured to:

receive, from a client of the database service, a request to read the data page that includes the particular data record.

10. The system of claim 9, wherein the read replica is further configured to:

receive a current version of the data page from the distributed storage service;

replace the cached version of the particular data record with a current version of the particular data record from the current version of the data page; and provide, to the client of the database service, the current version of the data page.

11. The system of claim 5, wherein the read replica is configured to:

receive, from a client of the database service, a request to read a different data record stored by the database service, wherein a cached version of the different data record has not been indicated as stale; and provide, to the client of the database service, the cached version of the different data record.

12. The system of claim 5, wherein the read replica is configured to:

receive, from the primary node, an indication of a plurality of data pages stored in a cache of the primary node;

retrieve versions of the plurality of data pages from the distributed storage service, and store the retrieved versions of the plurality of data pages in the cache of the read replica.

13. The system of claim 5, wherein the read replica is configured to:

in response to a failure of the primary node, convert into a new primary node without a loss of data from an update not reflected in the cache of the read replica at a time of conversion.

14. The system of claim 13, wherein the read replica is configured to:

determine, from the distributed storage service, which data in the cache of the read replica is stale; and indicate the determined stale data as stale.

15. The system of claim 13, wherein the read replica is configured to:

receive, from the distributed storage service, one or more transactions to data that the distributed storage service received from the primary node but that were not previously received by the read replica; and update a transaction table of the new primary node with the one or more transactions.

16. The system of claim 15, wherein the read replica is configured to:

determine that a particular transaction of the one or more transactions was related to the failure of the primary node; and roll back a change of the particular transaction.

17. A non-transitory computer-readable storage medium storing program instructions, wherein the program instructions are computer-executable to implement a read replica of a database service, wherein the read replica is configured to:

perform read requests on a database table stored by the database service for which a primary node, included within the database service and external to the read replica, performs write requests, wherein data for the database table is stored at a distributed storage service external to, and accessible over a network by, the read replica and the primary node of the database service;

receive, over a first network connection between the read replica and the primary node included within the database service, a log record that indicates that a cached version of particular data of the database table residing in a cache of the read replica is stale due to an update performed by the primary node to the particular data stored at the distributed storage service, wherein the log record comprises information representing the update to the particular data performed by the primary node;

update the cache of the read replica to indicate that the cached version of the particular data is stale responsive to receipt of the log record from the primary node;

receive, from a client of the database service, a request to read the particular data indicated to be stale in the cache of the read replica; and in response to receiving the request to read the particular data indicated to be stale in the cache of the read replica, obtain, over a second network connection between the read replica and the distributed storage service, a current version of the particular data, wherein the first network connection is different from the second network connection, and wherein the current version of the particular data includes the update to the particular data.

18. The non-transitory computer-readable storage medium of claim 17, wherein the log record is associated with a log sequence number, and wherein the read replica is further configured to:

receive, from the distributed storage service, one or more log records having respective log sequence numbers indicative of later points in time than a log sequence number for the cached version of the particular data;

apply the one or more log records from the distributed storage service and the log record from the primary node to the cached version of the particular data to create a current version of the particular data; and provide, to the client of the database service, the current version of the particular data.

19. The non-transitory computer-readable storage medium of claim 17, wherein the read replica is further configured to:

convert into a new primary node after failure of the primary node without a loss of data from an update not reflected in the cache of the read replica at a time of conversion.

20. The non-transitory computer-readable storage medium of claim 19, wherein the read replica is further configured to:

request, from the distributed storage service, data records with corresponding log records later than a last log record that have changed, and invalidate the data records in the cache.

21. The non-transitory computer-readable storage medium of claim 17, wherein the read replica is further configured to:

update a transaction table of the read replica with one or more transactions received from the distributed storage service, wherein the one or more transactions were not previously received by the read replica.

* * * * *